(12) United States Patent  (10) Patent No.: US 8,489,635 B1
Phoha et al.  (45) Date of Patent: Jul. 16, 2013

(54) METHOD AND SYSTEM OF IDENTIFYING USERS BASED UPON FREE TEXT KEYSTROKE PATTERNS

(75) Inventors: Vir V Phoha, Ruston, LA (US); Shrijit S Joshi, Jacksonville, FL (US)

(73) Assignee: Louisiana Tech University Research Foundation, a division of Louisiana Tech University Foundation, Inc., Ruston, LA (US)

( * ) Notice: Subject to any disclaimer, the term of this patent is extended or adjusted under 35 U.S.C. 154(b) by 312 days.

(21) Appl. No.: 12/686,455

(22) Filed: Jan. 13, 2010

(51) Int. Cl.
*G06F 17/30* (2006.01)
(52) U.S. Cl.
USPC ........... 707/781; 707/783; 707/785; 713/184; 713/186
(58) Field of Classification Search
USPC .................. 707/781, 783, 785; 713/184, 186
See application file for complete search history.

(56) References Cited

U.S. PATENT DOCUMENTS

| 4,805,222 | A | 2/1989 | Young et al. |
| 7,206,938 | B2 | 4/2007 | Bender et al. |
| 2008/0034218 | A1* | 2/2008 | Bender .......................... 713/186 |

OTHER PUBLICATIONS

Yong Sheng et al., "A Parallel Decision Tree-Based Method for User Authentication Based on Keystroke Patterns", IEEE, Aug. 2005, pp. 826-833.*
Net Nanny Software International Inc., Technical Report BioPassword Keystroke Dynamics, Copyright Oct. 2001, 12 pages.
Umphress, David and Williams, Glen, Identity verification through keyboard characteristics, Int'l Journal of Man-Machine Studies, 1985, pp. 263-273, vol. 23, Issue 3, Academic Press Inc. (London) Limited.
Leggett, John and Williams, Glen, Verifying identity via keystroke characteristics, Int'l Journal of Man-Machine Studies, 1988, pp. 67-76, vol. 28, Issue 1, Academic Press Limited.
Brown, Marcus and Rogers, Samuel Joe, User identification via keystroke characteristics of typed names using neural networks, Int'l Journal of Man-Machine Studies, 1993, pp. 999-1014, vol. 39, Issue 6, Academic Press Limited.
Monrose, Fabian and Rubin, Aviel, Authentication via Keystroke Dynamics, Proc. of the ACM Workshop, 1997, pp. 48-56, ACM, Inc.
Robinson, John A., et al., Computer User Verification Using Login String Keystroke Dynamics, IEEE Transactions on Systems, Man, and Cybernetics-Part A: Systems and Humans, Mar. 1998, pp. 236-241, vol. 28. No. 2.
Bleha, Saleh, et al., Computer-Access Security Systems Using Keystroke Dynamics, IEEE Transactions on Pattern Analysis and Machine Intelligence, Dec. 1990, pp. 1217-1222, vol. 12, No. 12.
Ruta, Dymitr and Gabrys, Bogdan, Classifier selection for majority voting, Information Fusion 6, 2005, pp. 63-81.
Yu, Enzhe and Cho, Sungzoon, Keystroke dynamics identity verification—its problems and practical solutions, Computers & Security, 2004, pp. 1-13.

(Continued)

*Primary Examiner* — Monica Pyo
(74) *Attorney, Agent, or Firm* — Jones Walker LLP

(57) ABSTRACT

A method of identifying a user as an authorized user from free test text typed by that user into an input device. From the received test text, features associated with the typed text are extracted, such as timing data associated with alphanumeric letter pairs. These extracted features are compared to previously stored series of authorized user profiles, where the authorized user profiles were generated from a trial typing sample of alphanumeric data from each associated authorized user. The comparison identifies one of the authorized users with the user, and a score is derived to measure the strength of the comparison. If the score exceeds a threshold level, the user is identified as that authorized user.

18 Claims, 8 Drawing Sheets

OTHER PUBLICATIONS

Rodrigues, Ricardo N., et al., Biometric Access Control Through Numerical Keyboards Based on Keystroke Dynamics, Advances in biometrics; international confernce, ICB 2006, Hong Kong, China, Jan. 5-7, 2006; proceedings, pp. 640-646.

Monrose, Fabian, Keystroke Dynamics as a Biometric for Authentication, Courant Institute of Mathematical Sciences, Mar. 1, 2999, 15 pages, New York University, New York, NY.

Monrose, Fabian and Rubin, Aviel D., Keystroke dynamics as a biometric for authentication, Future Generation Computer Systtems 16, 2000, pp. 351-359.

Obaidat, Mohammad S. and Macchiarolo, David T., An On-Line Neural Network System for Computer Access Security, IEEE Transactions on Industrial Electronics, Apr. 1993, pp. 235-242, vol. 40, No. 2.

Obaidat, M.S. and Macchairolo, D.T., A Multilayer Neural Network System for Computer Access Security, IEEE Transactions on Systems, Man, and Cybernetics, May 1994, pp. 806-813, vol. 24, No. 5.

Monrose, Fabian, et al., Password hardening based on keystroke dynamics, Digital Object Identifier, 2001, pp. 1-15, vol. 1, published online Springer-Verlag 2001.

Song, Dawn Xiaodong, et al., Timing Analysis of Keystrokes and Timing Attacks on SSH, Usinex Assoc. Proceedings of the 10th USENIX Security Symposium, Aug. 2001, Washington, D.C.

Trostle, Jonathan T., Timing Attacks Against Trusted Path, pp. 10 pages, Provo, UT.

Peacock, Alen, et al., Typing Patterns: A Key to User Identification, Usability and Security, Sep./Oct. 2004, pp. 40-47, IEEE Computer Society.

Gunetti, Daniele, Dealing with Different Languages and Old Profiles in Keystroke Analysis of Free Text, Dept. of Informatics, University of Torino, 2005, pp. 347-358.

Bergadano, Francesco, et al., User Authentication through Keystroke Dynamics, ACM Transactions on Information and System Security, Nov. 2002, pp. 367-397, vol. 5, No. 4.

Danielle Gunetti and Claudia Picardi, Keystroke Analysis of Free Text, ACM Transactions on Information and System Security, Aug. 2005, pp. 312-347, vol. 8, No. 3, Publications Dept. ACM, Inc., New York, New York.

\* cited by examiner

Typed text - "aaa ab ab aa"

| Letter pair | Key press latency |
|---|---|
| aa | 110 |
| aa | 90 |
| ab | 170 |
| ab | 160 |
| aa | 100 |

METHOD AND SYSTEM OF IDENTIFYING USERS BASED UPON FREE TEXT KEYSTROKE PATTERNS

FIELD OF INVENTION

User identification methods for providing access or authorization to a system based upon biometrics, more particularly, keystroke patterns.

BACKGROUND OF THE INVENTION

User authorization methods based upon biometric data, for instance using users' physiological characteristics (such as fingerprint) or behavioral characteristics (such as keystroke pattern), have been employed as security measures. Biometrics pattern based user authentication system can be employed for both (1) verification and (2) identification. In user verification system, user makes a claim of status (such as using a login id) and the system performs a one-to-one search to verify the claim. In user identification system, the system performs a one-to-many search to identify a user from a set of users. User verification system typically makes a decision on the authenticity of the claimed user using some user-defined-threshold(s). Once verified, the identified user may be check as an authorized user. As used herein, "user identification" includes both verification, identification and authorization functions.

Prior art identification using keystroke patterns includes use of a fixed text string as a means of identification, but not a string of arbitrary symbols (e.g. "free text"). Keystroke patterns provide a cost-effective solution for the user authentication problem. This is because keystroke patterns based user authentication system does not require a separate device for extracting the measurements from users' typing to form a keystroke pattern. Additionally, keystroke patterns based user authentication system can be used for both static user authentication (i.e., authenticating user before giving him (or her) access to the computer system) and continuous user authentication (i.e., after a user has been given access to the computer system, authenticate the identity of the user periodically). Continuous user authentication using keystroke patterns would not be intrusive for the users because the system could run in the background while the user is typing at a keyboard.

User authentication using a physiological biometric identifier is considered to be more successful than user authentication using keystroke patterns. One reason may be that keystroke pattern are from the domain of behavioral biometric identifiers and typing behavioral biometric identifiers may change between two provided typing samples because of change in psychological (or physiological) condition of the user. In addition, keystroke patterns of a user may show some variation between two consecutively provided typing samples even without any evident change in the psychological (and physiological) condition of the user.

Therefore to minimize the effects of variability in the keystroke patterns on the performance of user authentication system, most of the previous studies have reported the performance of their proposed user authentication methods using the following experimental settings: (1) each user provided more than one typing sample of a fixed text string to create his (or her) typing profile; (2) users provided all the typing samples in one session (consecutive samples) to supply keystroke data for creating their typing profiles; and (3) the typing sample was discarded if the user made any typing error while providing a typing sample. From these experimental settings, these authentication methods created a typing profile of a user using a structured text analysis, where the words and arrangement of words typed is fixed. However, the typing profile of a user which is derived from consecutively provided fixed typing samples may not be an accurate representative of the user's typing at a keyboard. This is because keystroke patterns of a user can change with change in psychological condition of the user. Also, we conclude that these authentication methods are not applicable for the problem of identifying a user given arbitrary text input (i.e. "free" text"), or portions of text randomly taken from a larger test manuscript. Since an arbitrary text string is not the same string of characters input by the user, "impersonation" is more difficult to achieve. An arbitrary text model is more desirable as it would be more difficult for an imposter to replicate the typing profile of an authorized user on arbitrary text. As used herein, "arbitrary" text of free text, in the broad sense, means a typing sample that is not a fixed string of symbols that the user would always type. For instance, a user ID/password is considered "fixed" text, not free text, as the text is constant over a period of time. Arbitrary or free text means that the test text varies from session to session, and may simply be random text input by the user.

Furthermore, presence of outliers in the data can adversely affect the performance of keystroke patterns based user authentication system if the outliers have not been detected and dealt with effectively. This is because when some observations deviate too much from other observations (i.e., outliers), and if used for creating a typing profile of a user, then the typing profile may not accurately represent the user's normal typing at a keyboard. Some prior studies have detected outliers in the keystroke data, but these have detected outliers using some standard statistical distribution techniques.

An improved keystroke identification/authorization technique capable of using arbitrary text, and improved outlier detection methods, are needed. The following is based upon a PhD dissertation by Shrijit S. Joshi, supervised by Dr. Vir Phoha, entitled "Naïve Bayes and Similarity Based Methods for Identifying Computer Users Using Keystroke Patterns" presented at the College Of Engineering And Science, Louisiana Tech University, in Ruston, La., which is hereby incorporated by reference.

SUMMARY OF THE INVENTION

Each authorized user creates a training data set of keystroke data. Outliers in the data set are preferably identified and removed from the training data set. From the training data set, an authorized user profile is generated for each authorized user. The authorized user profiles contains the parameters against which a test data set is compared. Two methods are preferred to compare the test data set against the keystroke parameters or authorized user profile for determining the likelihood that the user is an authorized user: (1) competition between naïve Bayes models for user identification (CNBM) and (2) similarity based user identification method. A user desiring authorization or identification will type in a test data set, which can be arbitrary text (e.g. the system will present an arbitrary test text for the user to replicate, or the user may simply type a test string). Keystroke parameters are derived from the test sample and compared against the stored authorized user profiles to see if the user can be identified as one of the authorized users. The method can identify the user given arbitrary text i.e., a text whose structure is arbitrary, and preferably the trial text changes between identification requests. The method may be used to verify a user as an authorized user, to confirm the identity of a user, or to continuously or periodically confirm and verify the identity of the user.

BRIEF DESCRIPTION OF THE DRAWINGS

FIG. 3 is a table showing sample text typed and the feature values associated with the typed text.

DETAILED DESCRIPTION OF THE INVENTION

Figure 1:
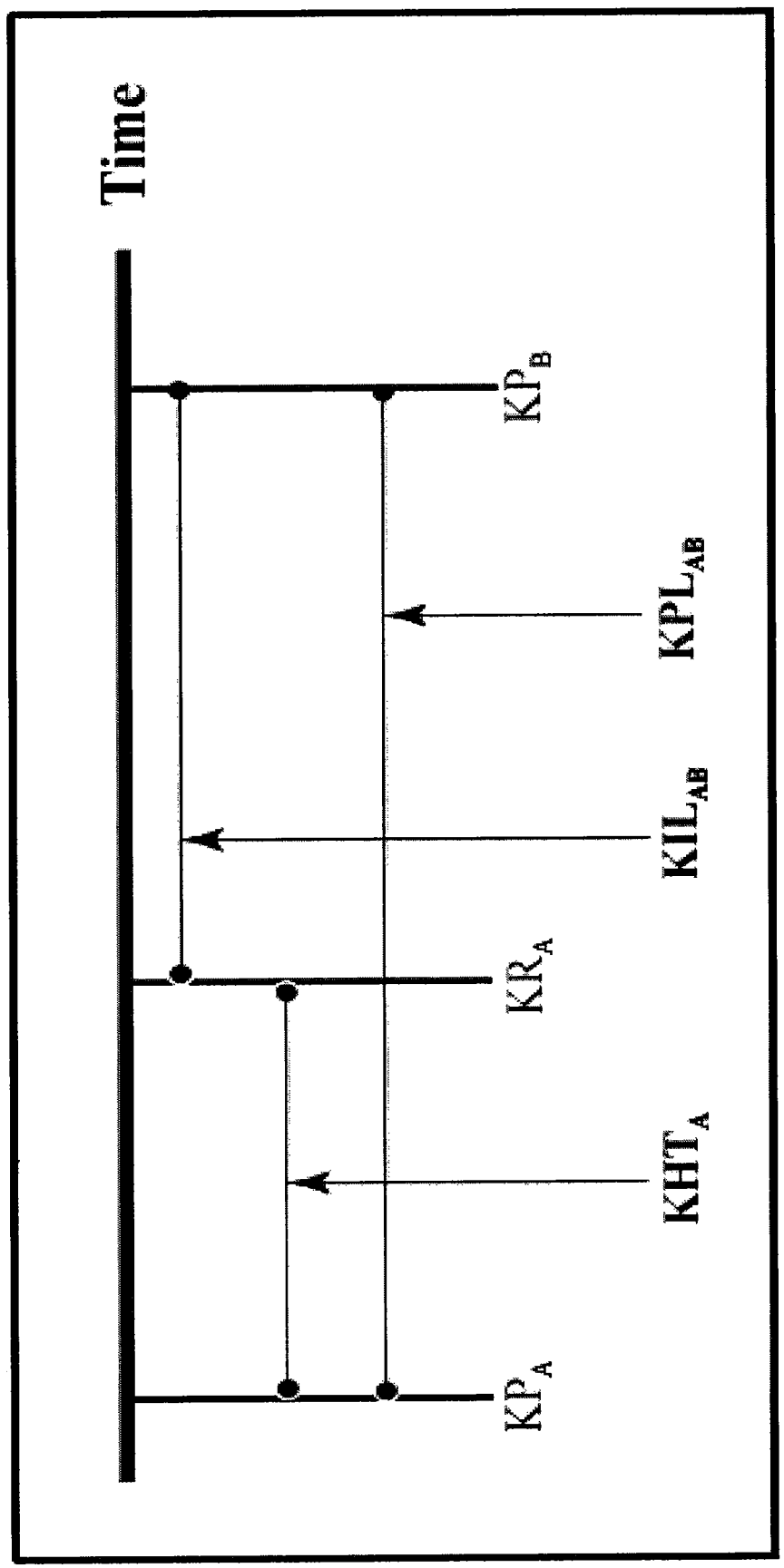
FIG. 1 is a schematic of a time line showing derivation of the key feature values.

Creation of an Authorized User Training Data Set and Profile Determination of Features The objective of the training phase in each method is to create a typing profile for each authorized user, using the training typing samples provided by each authorized user. Before creating a typing profile of a user, in the preferred embodiments, two data preprocessing operations are performed: (a) Feature extraction and (b) Outlier detection. In the 'feature extraction' operation, feature values (in one embodiment, the features were adjacent letter pairs and the feature values are "key press latency" times between adjacent letters) are extracted from the provided training typing samples. In the 'outlier detection' operation, outlying feature values that may be present in the extracted feature values are detected using our proposed distance based outlier detection method.

Feature Extraction

A typing sample (preferably a number of typing samples) are collected from each authorized individuals. Preferably, the samples are collected at different times of the day, to allow for variations in user attention. The samples preferably are collected from a data entry device (such as a "qwerty" keyboard on a desktop computer). Preferably, the device used for entry of the training data set will be similar to that used for later acquired test data for use in user identification. The number of typing samples in the training data set should be sufficient so that statistical characteristics of the data set are meaningful. In one trial, 15 total typing samples were collected from each authorized user, using the following trial setup: (1) typing samples were created so that one sample did not exactly match that of any other sample (the structure of each sample was different from other samples); (2) the samples had lengths varying between 850 and 972 characters; (3) authorized users were instructed to provide samples at different times of the day; and (4) authorized users were allowed to make typing error(s).

To demonstrate the performance of the proposed method, user identification experiments were performed on six datasets created from the training data. Empirical evaluations indicates that when 14 typing samples (collective letter count of about 1200) are selected in the training data of each user, the identification accuracy of the preferred embodiments, on average, is about 99.33%. Not unexpectedly, the identification accuracy of the method decreases with a decreasing number of typing samples selected in the training data of each user.

For each typing sample, a background program was executing that recorded (1) the ASCII code of each pressed key, (2) the time when the keys were pressed, (3) the ASCII code of each released key, and (4) the time when the keys were released. When a user was typing in the text area, a background program captured two Windows Messages: WM_KEYDOWN and WM_KEYUP. WM_KEYDOWN was used in extracting the ASCII value of a pressed key and recording the time when the key was pressed. Similarly, Windows Message WM_KEYUP was used in extracting the ASCII value of a released key and recording the time when the key was released. These key press and key release timings were recorded in milliseconds using SYSTEMTIME structure which has a timing resolution with an order of thousandth of a second ($10^{-3}$). Previous studies have empirically shown that authentication systems perform well when the timings are recorded with a resolution of an order of thousandth of a second.

For convenience, only the letters a-z were used (without distinction of capital letters), and "space" was not included—hence, the sequence "cf cde" detects the following letter pairs—cf, cd, and de. From these recordings, "key press latency" values between two successively pressed keys were calculated. As a consequence, for each typing sample, a set of 26×26=676 vectors is used, each vector containing the extracted key press latency values for a particular combination of letters. For example, the $1^{st}$ vector was used to record the extracted key press latency values for the letter pair 'aa' and the $676^{th}$ vector was used to record the extracted key press latency values for the letter pair 'zz'. Some vectors may be were empty because some letter pairs did not occur in the typed text. Any alpha-numeric characters could be used in the method, but for convenience, the remaining description will use adjacent typed letters (a-z) as the features for the model.

When a user is providing a typing sample at a computer keyboard, timing information of the typing sample is typically extracted by recording two keystroke events: (1) key press event and (2) key release event. These recordings can be used to ascertain the time when a key was pressed and when a key was released, and the ASCII value of a pressed key and the ASCII value of a released key. The ascertained timing information, regarding the time when a key was pressed and when a key was released, aids in determining: (1) latency between consecutive key press and key release events i.e., the amount of time a key was held down and (2) latency between consecutive key release and key press events i.e., the flight time from a released key to a pressed key. The amount of time a key was held down is referred as 'key hold time' and the flight time from a released key to a pressed key is referred as 'key interval latency'.

In one embodiment, the recordings of key press events and key release events are used to determine the latency between two successively pressed keys (referred as key press latency). Note 'key press latency' is determined by adding the latency between consecutive key release and key press events (i.e., key interval latency) to the key hold time for the first letter in the letter pair (i.e. the latency between consecutive key press and key release events).

To demonstrate the procedure for extracting key press latency values from a typed text, FIG. 1 illustrates the extraction of the key press latency value when a string "AB" is typed. In FIG. 1, the key press time of letter 'A' and the key press time of letter 'B' are represented by $KP_A$ and $KP_B$, respectively (non-capital letters were actually used). In the figure, the key release time of letter 'A' is represented by $KR_A$. As shown in FIG. 1, the key hold time of letter 'A' (represented as $KHT_A$) is $KHT_A=KR_A-KP_A$. Also we can see in FIG. 1 that the key interval latency between the letter pair 'AB' (represented as $KIL_{AB}$) is $KIL_{AB}=KP_B-KR_A$. From the key hold time of letter 'A' and the key interval latency between the letter pair 'AB', the key press latency between the letter pair 'AB' (represented as $KPL_{AB}$) is determined as $KPL_{AB}=KHT_A+KIL_{AB}$.

In one embodiment, the feature value used is KPL for each observed letter pair in a provided typing sample. Other measures could be used for features, including KIL between adjacent letters, or KPL+KHT for the "second" letter of a letter pair. Indeed, the method could be used on three (or more) consecutive letters, but more typing samples may be needed to populate the increased number of feature vectors. A letter pair may be repeated in a provided typing sample i.e., one or more key press latency values can be extracted for a letter pair from the provided typing sample. Therefore to record all the extracted key press latency values for each possible letter pair (or feature) using only pairs of the letters a-z, 676 feature vectors are populated with the feature values for the particular letter pair associated with the letter pair. Some vectors may be empty (e.g. not necessary) because some letter pairs may not be observed in a typing sample.

The extracted feature values from a typing sample are recorded in the feature vectors. For each sample text or training typing samples of a user, an associated feature vector set is created. The features chosen can vary based upon the application, and can include timing for a particular letter, timing for letter pairs or other value pairs (for instance, if spaces, capital letters, punctuation marks, and numbers or other alphanumeric characters may be included in sample set), timing information for triplets of letters or typed values (as opposed to pairs of letter). As referenced herein, a typing characteristic is chosen as the "features" (adjacent letter pairs, for instance) and the "feature values" are those values associated with particular features (timing recorded between for that feature, such as KPL times) and assigned to that feature. The populated feature vectors constitute the authorized user's training data set.

Figure 2:
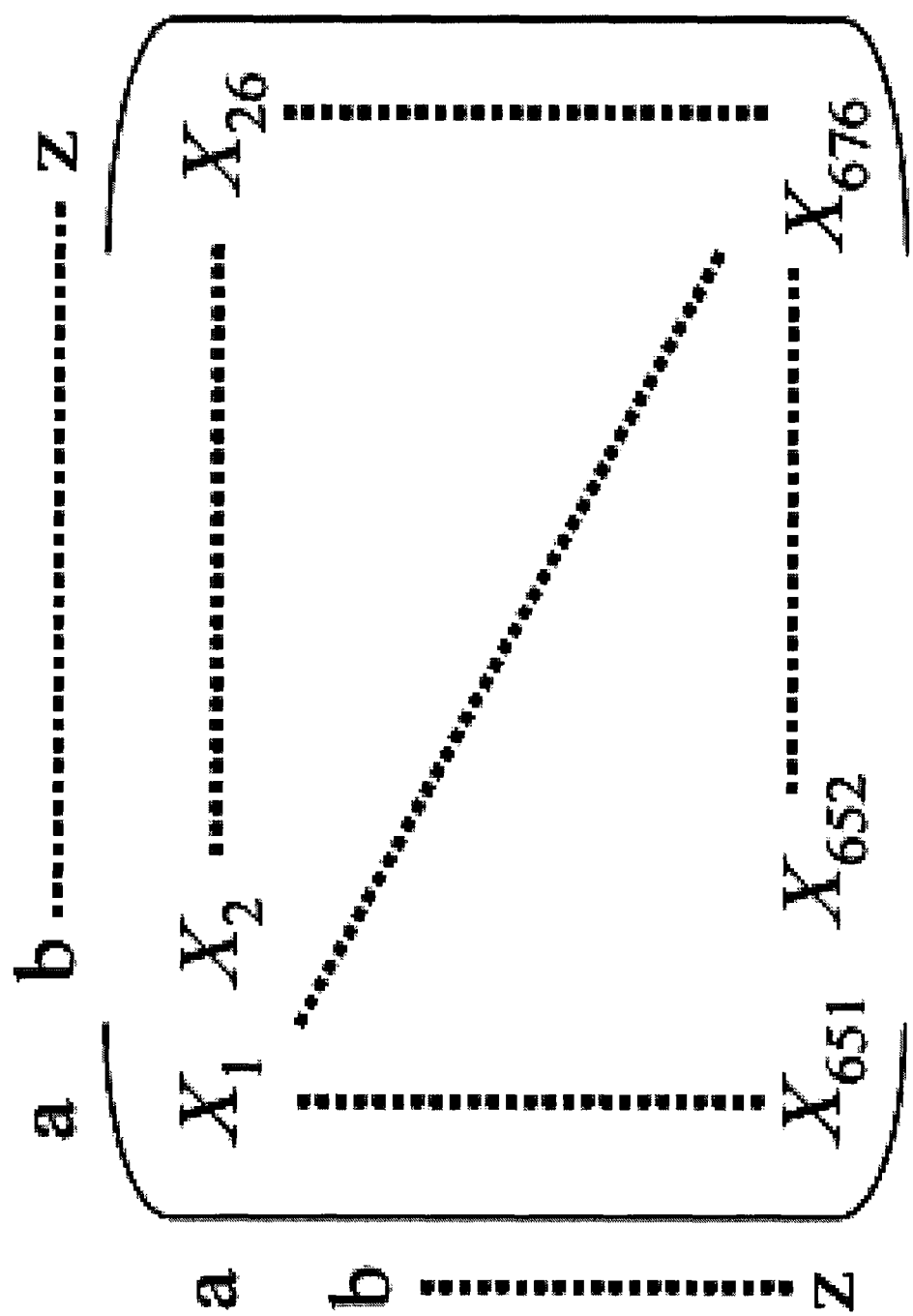
FIG. 2 is a schematic depiction of a 26×26 vector of features.

Mathematically, these vectors of a user can be represented as $$X=\{X_1, X_2, \ldots, X_{n-1}, X_n\}, \quad \text{Equation 1}$$

where subscript n represents the total number of vectors (in the example, n=676), $X_1$ represents a vector containing the extracted feature values for the first feature (i.e., for letter pair 'aa'), $X_2$ represents a vector containing the extracted feature values for the second feature (i.e., for letter pair 'ab'). A pictorial representation of these $X_1$ through $X_{676}$ vectors is given in the FIG. 2.

Furthermore, each vector $X_i$ can be represented as $$X_i=\{x_i^1, x_i^2, \ldots, x_i^{m_i}\}. \quad \text{Equation 2}$$

where subscript i refers to an $i^{th}$ feature, superscript $m_i$ represents the total number of times feature value for the $i^{th}$ feature is recorded, and represents the recorded feature value for the $i^{th}$ feature at the $j^{th}$ component position in the $X_i$ vector. For instance—let us suppose, user typed a text "aaa ab ab aa" using a keyboard.

As shown in the FIG. 3, from the typed text "aaa ab ab aa", we can extract three feature values for the letter pair 'aa' and two feature values for the letter pair 'ab'. The extracted feature values (henceforth, referred to as "key press latency values") from this typed text are given in the FIG. 3. We can see that (1) the extracted key press latency values for the letter pair 'aa' are 110, 90, and 100; therefore, in the figure $X_1=\{110,90,100\}$ and (2) the extracted key press latency values for the letter pair 'ab' are 170 and 160; therefore, in the figure $X_2=\{170,160\}$.

Outlier Removal from the Training Data Set

A distance based outlier detection method is one method to detect outliers or abnormal data points from the training data. For explanation, suppose the training data is extracted from N typing samples of a user, representing entries in a possible 676 vector set. Outliers in each vector are detected using the following three steps:
(1) Determining the neighborhood of each key press latency value (data point) present in the vector;
(2) Determining the number of neighbors of each data point; and
(3) Data point is identified as an 'outlier' if the number of neighbors of the data point is less than a user-defined value.

A neighborhood of a data point represents a region around the data point, which is determined using a distance threshold "r", where distance is measured using a predefined metric. The number of neighbors of a data point represents the total number of data points of the vector that fall within the neighborhood of the data point. In one trial, the metric chosen was "absolute value" with a distance threshold of r=100 ms. A data point is flagged as an 'outlier' if the number of neighbors identified for that data point is less than a specified β of the total data points present in the vector (in experiments, β=68%, about one standard deviation was employed). These values chosen were based upon an assumed Gaussian distribution for the feature values, and, for typed text, this assumption appears reasonable. If the party employing the methods has additional information that would indicate an expected distribution other than Gaussian, that knowledge can be used to choose the neighborhood value, and the number of neighbors required to be considered an "inlier" data point. The value of 100 ms was chosen based upon a mean value (over all letter pairs) of about 90 ms with a 2 sigma range, of about 60 to 150 ms. The sample data was collected using a standard sized QWERTY desktop/laptop type keyboard. If a different keyboard is used, for instance, a alphanumeric keyboard of a standard cell phone, the digital QWERTY keyboard of a phone (where two fingers are used instead of all fingers) or other keyboard type, the neighborhood definition and neighbor population may be adjusted based upon experience with the particular keyboard. Additionally, the values chosen were constant for all users and all letter pairs. With sufficient samples and mining of the trial data sets, individual values (r and β values) may be selected for each user, and even for each user's letter pairs.

For purposes of explanation, outlier detection will use the values in Example 1—seven feature values (in milliseconds) extracted in our user identification experiment for the $171^{th}$ feature (i.e., for letter pair 'go') for a particular user from the 14 typing samples of that user: 234, 516, 281, 250, 281, 265, and 1500 (these are all values of the 171th feature from all of the 14 typing samples grouped together).

In this example the value of $m_{171}$ (as given in the Equation 2) is seven because a total seven feature values are extracted for the $171^{th}$ feature from the selected training typing samples of a user. The vector $X_{171}$, which is created to record the extracted feature values for the $171^{th}$ feature, is given as:

$$X_{171}=\{x_{171}^1=234, x_{171}^2=516, x_{171}^3=281, x_{171}^4=250, x_{171}^5=281, x_{171}^6=265, x_{171}^7=1500\}.$$

Figure 4:
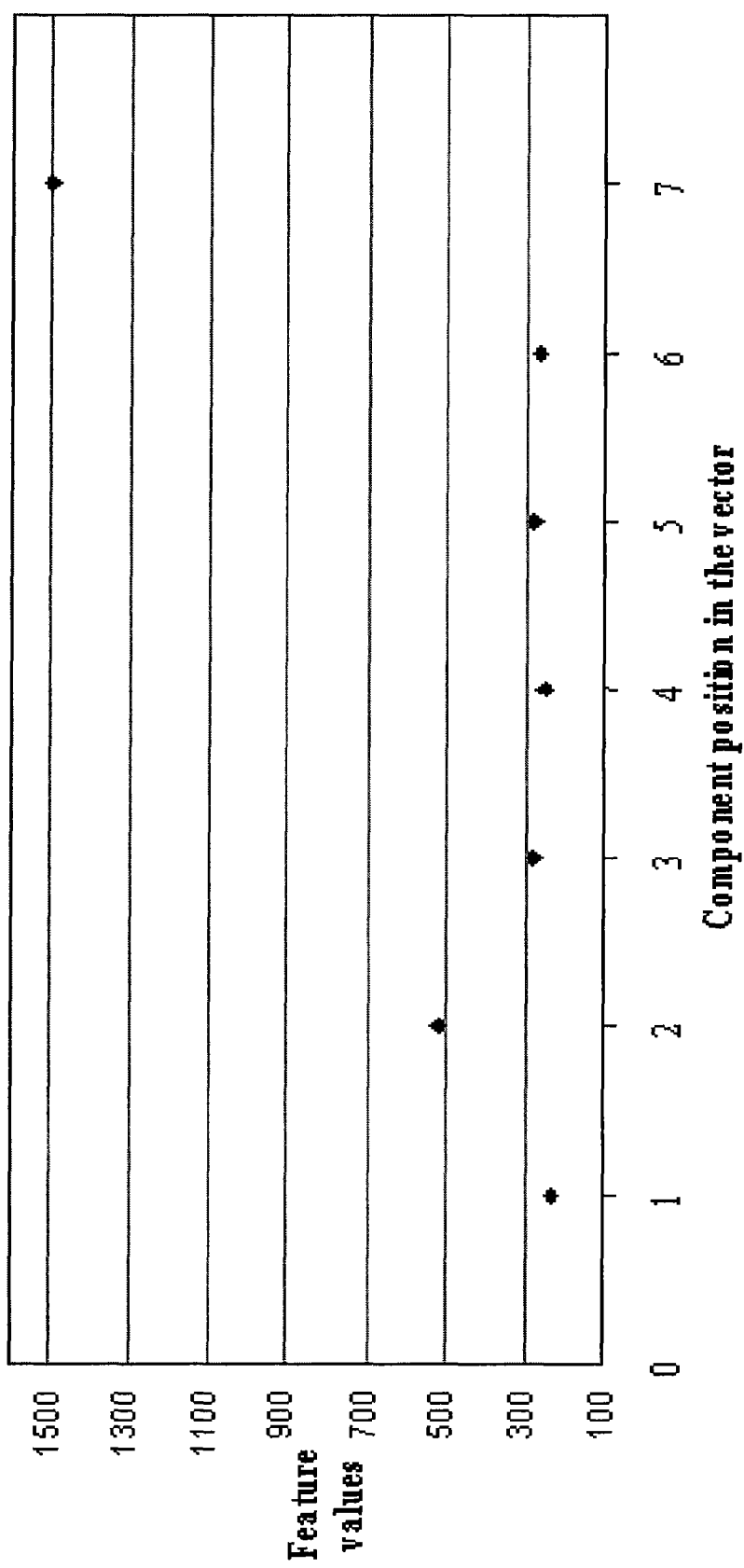
FIG. 4 is a graph of feature values.

The seven values present in the vector $X_{171}$ are plotted in the FIG. 4.

By visual inspection, the five values: $x_{171}^1, x_{171}^3, x_{171}^4, x_{171}^5$, and $x_{171}^6$ are grouped together with the values ranging from 234 to 281. However, the two values of the vector: $x_{171}^2$ and $x_{171}^7$ shows a variability with the remaining values of the vector $X_{171}$. These two values can be classified as the candidate outliers of this vector. To detect such outlying values in a vector, the following definitions are incorporated in one outlier detection method.

Figure 5:
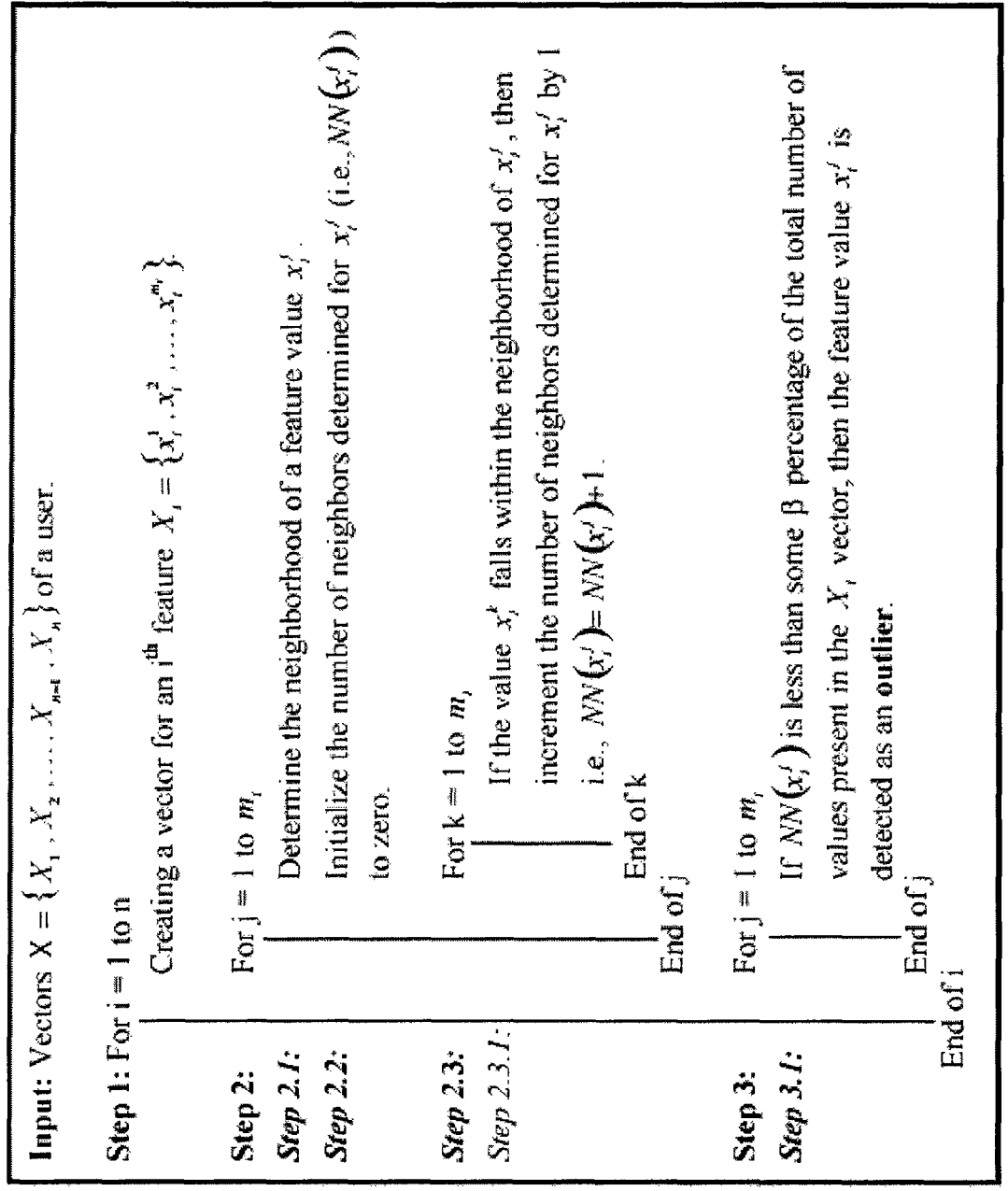
FIG. 5 depicts pseudo-code of one embodiment of a distance based outlier detection method.

A neighborhood of a feature value $x_i^j$ is defined as a region around the value $x_i^j$ which ranges from $x_i^j - r$ to $x_i^j + r$. A feature value $x_i^k$ is a neighbor of a feature value $x_i^j$, if the value $x_i^k$ falls within the neighborhood of $x_i^j$. Finally, a feature value $x_i^j$ in a vector $X_i$ is an outlying value with respect to the remaining feature values of the vector $X_i$, if less than $\beta$ feature values of the vector are within the neighborhood of $x_i^j$. A sample pseudo code for determining neighbors is depicted in FIG. 5. This method in essence looks for clusters of data pointing, and labels as an outlier those data points not within a sufficiently dense cluster.

A pseudo-code of the proposed distance based outlier detection method is given in FIG. 5. In FIG. 5, the total number of neighbors determined for an $x_i^j$ value is denoted by $NN(x_i^j)$. If the total number of neighbors determined for a feature value is less than some $\beta$ percentage of the total number of values present in the vector, then the feature value is detected as an outlier. Otherwise, the feature value is considered as an "inlier".

Note the parameter r is useful for determining the neighborhood of a feature value and the parameter $\beta$ aids in setting a criterion for detecting outliers in a vector. Both these parameters are set to some pre-defined values. A known problem of overfitting (i.e., selecting parameter values in such a way that method attains the best results on a particular dataset, but fails to attain the same kind of results on another dataset) may arise. To limit the overfitting problem, r was set to 100 based upon observed variances in the typing samples, and $\beta$ to 68% throughout our user identification experiments. In certain applications, r and $\beta$ may vary based upon the identity of the authorized user—for instance, for experienced or consistent typists, smaller r and larger $\beta$ values may be appropriate.

TABLE 1

| Component Position in the vector | Feature Value | Neighborhood region | Neighbors | Number of Neighbors | Outlier decision |
|---|---|---|---|---|---|
| 1 | 234 | [134, 334] | 234, 281, 250, 281, 265 | 5 | No |
| 2 | 516 | [416, 616] | 516 | 1 | Yes |
| 3 | 281 | [181, 381] | 234, 281, 250, 281, 265 | 5 | No |
| 4 | 250 | [150, 350] | 234, 281, 250, 281, 265 | 5 | No |
| 5 | 281 | [181, 381] | 234, 281, 250, 281, 265 | 5 | No |
| 6 | 265 | [165, 365] | 234, 281, 250, 281, 265 | 5 | No |
| 7 | 1500 | [1400, 1600] | 1500 | 1 | Yes |

Table 1 illustrates the obtained results of the outlier detection method on the Example 1. In the table: (1) the first column 'Component Position in the vector' gives a sequential ordering of the seven components of the $X_{171}$ vector, (2) the second column 'Feature Value' shows the feature values (in milliseconds) present in the $X_{171}$ vector, (3) the third column displays the 'Neighborhood region' determined for each of the components of the vector (neighborhood of a feature value is determined in the Step 2.1 of the method, as shown in the FIG. 5), (4) the fourth column lists the 'Neighbors' of each of the components of the vector, (5) the fifth column determines the 'Number of Neighbors' of each of the seven components of the vector, and (6) the sixth column makes an outlier decision on each component based on the number of neighbors determined for a component. Note for this example, the value of $\beta = 0.68 \times 7 = 4.76$; therefore, feature values 516 and 1600, which have less than $\beta$ neighbors, are considered as outliers. These detected outliers are preferably discarded from the vector before creating the authorized user typing profiles.

To demonstrate the performance of the proposed distance based outlier detection method, user identification experiments were performed on six datasets. (Note total 1150 sets were created from the six datasets in such a way that the training data present in one set does not exactly match with that present in another set.) For determining the improvement in the identification accuracy of the proposed methods, user identification experiments were performed on both (1) when the detected outliers are discarded from the training data and (2) when the outliers are not discarded from the training data. Empirical results show that the identification accuracy of the CNBM method is improved, on average, by 42.16% and the identification accuracy of the method "Similarity based user identification method" is improved, on average, by 42.53% when the detected outliers by our proposed outlier detection method were discarded from the training data of a user. Hence, it is preferred that outliers be detected and removed from the training data sets. At the conclusion of this stage, the feature values have been vectorized with outliers preferably removed. Next, the authorized user profiles are created from each authorized users trial data set. The contents of the authorized user profile can vary based upon the method chosen for the user identification or authorization stage.

User Identification Phase

Two preferred embodiments of user identification methods include: (1) Competition between naïve Bayes models (CNBM) for user identification and (2) Similarity based user identification method. The objective of the user identification phase in each proposed method is to identify a user given a test typing sample. "Identification" can include a finding that the tested user is not an authorized user. In the user identification phase, the identity of the user is tested using a one-to-many search (e.g. the test user is compared to the profiles of many authorized users). The method may also be applied in a one-to-one situation (where the user has identified himself/herself, such as with a "log-in" id, and the method is used to confirm that user's identification).

The tested user provides a test typing sample. Preferably, the system displays arbitrary text on a display device for the user to attempt to replicate. Preferably, the test text varies from the identification sessions, and can be random text generated by the processor connected to the input terminal (display device and text input "keyboard"). Outliers are not generally be removed from the test data set, and the test text can be a fairly small population (e.g. 8-15 letter pairs, preferably 10 letter pairs). As discussed above, preferably the user typed text should be free text, but the method also works for fixed text. The text to be typed may be generated by the system and presented to a user to replicate, or the user may simply type in a string of text, not prompted by the system. The system may also periodically sample a user's typing (assuming the user has been authorized access to a text input device) to verify that the prior identified authorized user's identity has not changed.

Before searching for the identity of the user, feature values (here observed key press latency values for the letter pairs) are extracted from the provided test typing sample. A letter pair may be repeated in a provided test typing sample i.e., one or more feature values are extracted for a letter pair from the provided test typing sample. Again, to record all possible extracted key press latency values for each possible letter pair, a total 26×26=676 vectors would be needed. However, in the test set, in general, 676 vectors will not be present. For ease of explanation, it will be assumed that all vectors are populated with values, including the null value, indicating the letter pair is absent. Each of these 676 vectors is used to record the key press latency values for a particular letter pair. The feature values (here key press latency values) contained in these 676 vectors constitute the test data.

In the user identification phase, these 676 vectors containing the test data are used to ascertain the identity of the user for the given test typing sample, by comparing the test data against a stores set of authorized user profiles. In general, we have found that ten (10) common features (e.g. letter pairs that appear in all authorized users profiles) provides sufficient data for proper identification with the method.

Creation of an Authorized User Profile Using CNBM

In a preferred embodiment of the training phase using the 'CNBM' method, the detected outlying values are discarded from the training data of a user and the remaining training data is used to create a typing profile of the user.

In the training phase, a naïve Bayes model is created for a user. Using only a-z letter pairs, the model has total 676 feature, where each feature corresponds to a particular letter pair. Under the naïve Bayes assumption, features of the model are independent of each other.

Each feature $X_i$ of the model is a discrete variable. However, the feature values that are extracted from a typing sample can range from 0 to almost $\infty$. Therefore, the feature values in the training data of a user must be discretized or binned into some pre-determined k bins for each feature. The probability parameters of each feature $X_i$ of the model, with k bins, can be represented as $$\Theta_i = \{\theta_i^1, \theta_i^2, \ldots, \theta_i^k\},\quad \text{Equation 3}$$

such that $$\sum_{j=1}^{k} \theta_i^j = 1.$$

Each $\Theta_i$ is assumed to follow a Dirichlet distribution with parameters $\alpha_1, \alpha_2, \ldots \alpha_k$ as the prior for each $\Theta_i$. The probability of each $\theta_i^j$ is estimated using the following equation $$\theta_i^j = \frac{\alpha_j + y_i^j}{\alpha + m_i'},\quad \text{Equation 4}$$

where (1) $m'_i$ represents the total number of times the feature values for the $i^{th}$ feature is recorded in the training data of the user (after the detected outliers are discarded) from the $X_i$ vector and (2) $y_i^j$ represents the total number of times (out of total $m'_i$ values) the feature values for the $i^{th}$ feature are discretized or binned into the $j^{th}$ bin, and (3) where $\alpha$ $$\alpha = \sum \alpha_j.$$

Typically, $\alpha_1, \alpha_2, \ldots \alpha_k$ are estimated using Jaynes prior estimate, i.e., setting the value of each $\alpha_j$ to zero—$\alpha_1 = \alpha_2 = \ldots = \alpha_k = 0$. However, if the value of any $y_i^j$ is zero, then zero probability value will be estimated for the parameter $\theta_i^j$. To avoid this practical problem, Laplace's estimate was used for setting the value of each $\alpha_j$. In Laplace's estimate, the value of each $\alpha_j$ is 1, i.e., $\alpha_1 = \alpha_2 = \ldots = \alpha_k = 1$.

In one embodiment, two bins are employed (k=2) for each feature. Feature values will thus be assigned to bin 1 or bin 2. An interval for the first bin of each feature is estimated by determining the mean and standard deviation value from the recorded feature values of each feature in the user's training data. More specifically; if $\mu_i$ and $\sigma_i$, respectively, represent the mean and standard deviation value of the recorded feature values for an $i^{th}$ feature (after discarding the detected outliers from the $X_i$ vector), then the interval for the first bin of this feature is $I=[\mu_i-\omega\sigma_i, \mu_i+\omega\sigma_i]$, for some user chosen value $\omega$. A feature value is "discretized" by assigning the feature value to the first bin if the value is within the interval I, and assigning the feature vale to the second bin if the value does not fall into the interval I. The population of each bin is tracked, as these populations will be used for determination of probabilities. The user profile will thus comprise, for each feature in the user profile, the values $\mu_i$, $\sigma_i$, $\omega$ the population of bin 1, and the population of bin 2. These stored values can be modified by combining the two values $\sigma_i$, $\omega$ into a single value $\sigma_i*\omega$ or by storing the interval values is $[\mu_i-\omega\sigma_i, \mu_i+\omega\sigma_i]$, or by storing the probabilities for the feature bins (for a 2-bin model, only one bin probability needs to be stored). If $\omega$ is constant for the method, $\omega$ may be stored once as a global value, and not stored with each user profile. These stored values may be modified (e.g. modify $\omega$) by a system administrator to account for changing user physiological characteristics, without the need to have new trial typing samples acquired. Note however, that if the physical characteristics of an authorized user radically changes, (for instance will a disability), new typing trials may be needed.

For a CNBM embodiment, the authorized user profile will thus comprise, for each feature, the values $\mu_i$, $\sigma_i$ (and possibly $\omega$), the population of bin 1, and the population of bin 2. Instead of storing the populations, the probability of a value being in bin 1 (or bin 2, for in a two bin model, Prob (bin1)+ Prob(bin 2)=1) could be stored, that is (1+population of bin 1)/(2+population of bin 1+bin 2) (using Laplace's estimate). As discussed above, these stored values can be reduced or modified (e.g. store $[\mu_i-\omega\sigma_i, \mu_i+\omega\sigma_i]$). This data set of feature characteristics comprises the authorized user profile for the CNBM method.

Parameter $\omega$ is useful for determining an interval for the first bin of each feature. A numerical value must be set for $\omega$ to estimating the parameters of the naïve Bayes model of each user. To limit the overfitting problem described earlier, the value of $\omega$ was set to two (2) throughout our user identification experiments for each user and feature. This value captures about 98% of the expected user values (outlier's removed) and for a Gaussian distribution, produces very acceptable results. As mentioned above, if a distribution other that Gaussian is anticipated, this value may be modified to reflect the expected distribution.

CNBM Method of Identification of a User Against the Authorized User Profiles.

One objective of the user identification phase in the 'CNBM' method is to identify a user as one (or none) from a set of users $U=\{U_1, U_2, \ldots, U_{N-1}, U_N\}$ using Bayes' theorem, where N represents the total number of users registered with the user identification system. A probability value for each authorized user $U_i$ that a set of vectors $Z=\{Z_1, Z_2, \ldots,$ $Z_{n-1}, Z_n\}$ is generated from his (or her) model is determined using the Bayes' theorem as follows:

$$P(U_i/Z) = \frac{P(Z/U_i) \cdot P(U_i)}{P(Z)}. \quad \text{Equation 5}$$

In the above equation, the first term $P(U_i/Z)$ is the posterior probability or conditional probability of user $U_i$ given a set of vectors Z. As set Z consists of vectors $Z_1, Z_2, \ldots, Z_n$, Equation 5 can be written as $$P(U_i/Z) = \quad \text{Equation 6}$$
$$P(U_i/Z_1, Z_2, \ldots, Z_n) = \frac{P(Z_1, Z_2, \ldots, Z_n/U_i) \cdot P(U_i)}{P(Z_1, Z_2, \ldots, Z_n)}.$$

Under the naïve Bayes assumption, all the features are independent of each other given a user $U_i$'s model. Therefore, Equation 6 can be written as $$P(U_i/Z) = \quad \text{Equation 7}$$
$$P(U_i/Z_1, Z_2, \ldots, Z_n) = \frac{P(U_i)}{P(Z_1, Z_2, \ldots, Z_n)} \prod_{j=1}^{n} P(Z_j/U_i)$$

Note that the term $P(Z)=P(Z_1 Z_2, \ldots, Z_n)$ in Equation 7 is considered as constant, because it does not provide any discrimination between the users. However, if needed, $P(Z)=\Sigma_i (P(Z/U_i)P(U_i))$.

Furthermore, each $Z_j$ vector consists of feature values $z_j^1, z_j^2, \ldots, z_j^{m_j}$, where (1) subscript j refers to a $j^{th}$ feature, (2) superscript $m_j$ represents the total number of times feature value for the $j^{th}$ feature is recorded in the vector $Z_j$, and (3) $z_j^t$ represents the recorded feature value for the $j^{th}$ feature at the $t^{th}$ component position in the $Z_j$ vector. Therefore, Equation 7 can be written as $$P(U_i/Z) = P(U_i/Z_1, Z_2, \ldots, Z_n) = \quad \text{Equation 8}$$
$$\frac{P(U_i)}{P(Z_1, Z_2, \ldots, Z_n)} \prod_{j=1}^{n} \left( \prod_{t=1}^{m_j} P(z_j^t/U_i) \right)$$

In the above equation, the numerator term $P(U_i)$ refers to the probability of observing user $U_i$ (out of N registered users). One method to estimate $P(U_i)$ is using the following equation:

$$P(U_i) = \frac{\eta_i}{\sum_{j=1}^{N} \eta_j}, \quad \text{Equation 9}$$

where (1) $\eta_i$ is the total number of training typing samples provided by the user $U_i$, (2) $\eta_j$ is the total number of training typing samples provided by a user $U_j$, and (3) N is the total number of users provided training typing samples (i.e., N represents the total number of registered users). This is only one method of estimating $P(U_i)$, other estimates could be used based upon other criteria. For instance, historical access criteria could be used to estimate $P(U_i)$. Consider a situation where the method is deployed on an office secured access point (e.g. a secured entrance, a computer terminal, etc) that is used by only four authorized users. If the access point is a dedicated access point (one where only one user may use the system at a time, for instance, an office computer), where the first authorized user accesses a dedicated access point ½ of the time, a second authorized user accesses ¼ of the time, and the $3^{rd}$ and $4^{th}$ authorized users accessing $\frac{1}{8}^{th}$ of the time eac, then $P(U_i)$ could be estimated as ½, ¼, ⅛ and ⅛ for the $1^{st}$, $2^{nd}$, $3^{rd}$ and $4^{th}$ user respectively. A similar situation can occur with a non-dedicated access point, such as a building. For instance, if user 1 is present in the office during business hours every day, user 2 every other day of the week (avg. 2,5 days/week), user 3 once a week, and user 4 once a month, then $P(U_i)$ could be estimated (assuming a 20 day work month) as $^{20}/_{35}$, $^{10}/_{35}$, $^{4}/_{35}$ and $^{1}/_{35}$ for user 1, 2, 3 and 4 respectively (e.g. (user days month/(total user days month)). $P(U_i)$ may be calculated and stored for each authorized user.

In the Equation 8, the term $P(z_j^t/U_i)$ refers to the probability of observing a feature value $z_j^t$ for the $j^{th}$ feature in the model of user $U_i$. A numerical value for the term $P(z_j^t/U_i)$ is determined in the following two steps: (1) first, the feature value $z_j^t$ is assigned (discretized) into one of the bins created for the $j^{th}$ feature in the model of user $U_i$, and (2) the estimated probability value of the bin is assigned to $P(z_j^t/U_i)$, where the probability is estimated as the (1+population in bin i)/(k+population all bins) (using Laplace's estimate, where k=number of bins present). As described above, one embodiment uses a two bin model, i.e. k=2.

For a two bin model, a numerical value of the term $P(z_j^t/U_i)$ can be determined if, and only if, the feature value $z_j^t$ can be assigned into either of the bins created for the $j^{th}$ feature in the model of user $U_i$. However, note that: (1) determining a bin to which a feature value can be assigned is based on the estimated interval for the first bin of the $j^{th}$ feature in the model of user $U_i$; and (2) an interval for the first bin of the $j^{th}$ feature (in the model of user $U_i$) can be estimated if, and only if, two or more feature values for the $j^{th}$ feature are observed in the user $U_i$'s training data. Hence, a numerical value for the term $P(z_j^t/U_i)$ cannot be determined if one, or less than one, time feature value for the $j^{th}$ feature is observed in the user $U_i$'s training data. That is, the letter pair must appear more than once in the training data set for inclusion in the CNBM method.

Because of this, a situation may arise where for one or more than one $z_j^t$ values, a numerical value for the term $P(z_j^t/U_i)$ can be determined for some authorized users, but not for all. In this situation, a probability estimate determined for each of the N registered users, that a set of vectors are generated from their respective naïve Bayes model, is not based on the same evidence, and this probability estimate preferably is not used for the CNBM method (Bayes' theorem should be used for comparing two or more posterior probabilities if, and only if, all the obtained posterior probabilities are determined using the same evidence). Therefore, to determine the posterior probability value for each user using the same evidence, only those features from $X_1, X_2, \ldots, X_n$ having a defined interval for the first bin, should be selected for use in the naïve Bayes' model of each of the N users. In other words, preferably we select the features from $X_1, X_2, \ldots, X_n$ such that $P(z_j^t/U_i)$ can be determined in each user's model, and thereby use the same evidence to determine posterior probability value for each authorized user. With sufficient trial typing samples for each authorized user, this should not be a hindrance to adoption of the CNBM method. Alternatively, the authorized user profiles can be adjusted to remove all features (for instance, set the feature values to the null value) for those features lacking multiple feature values across all authorized users, in which event, that particular letter pair would not be used for later comparison.

Finally, an initially identified user for a given test typing sample is the one whose posterior probability is the highest among all other users. Mathematically, identifying user $U_*$ for a given test typing sample is given as:

$$\text{Assign } Z \text{ to } U_* \text{ if } P(U_*/Z) = \max_{i=1:N} P(U_i/Z). \quad \text{Equation 10}$$

The assigned value for $P(U_*/Z)$ is considered the user's score. The following example—Example 2—will be used in the remainder of this application to illustrate the user identification phase of the 'CNBM' method.

TABLE 2

| Feature (letter pair) | Feature number | Feature value (in milliseconds) |
|---|---|---|
| pu | $Z_{411}$ | 135 |
| ur | $Z_{538}$ | 105 |
| rp | $Z_{458}$ | 95 |
| po | $Z_{405}$ | 90 |
| os | $Z_{383}$ | 107 |
| se | $Z_{473}$ | 74 |

Example 2: Let us suppose, user identification system has two registered users: $U_1$ and $U_2$. Let the model of each user is trained on the same number of training typing samples. Let a test typing sample with text "purpose" is provided by a user. In Table 2, each extracted feature value (key press latency value) from the test typing sample is given, along with the corresponding feature (letter pair) and its corresponding feature number. We can see in Table 2, following six letter pairs are observed in the test typing sample: (1) letter pair "pu", (2) letter pair "ur", (3) letter pair "rp", (4) letter pair "po", (5) letter pair "os", and (6) letter pair "se".

TABLE 3

Estimated mean and standard deviation for the extracted features in the trained models of two users:

| Feature (letter pair) | Feature number | User $U_1$ | | User $U_2$ | |
|---|---|---|---|---|---|
| | | Mean | Standard deviation | Mean | Standard deviation |
| pu | $Z_{411}$ | 120 | 3 | 130 | 10 |
| ur | $Z_{538}$ | 135 | 10 | — | — |
| rp | $Z_{458}$ | 90 | 12 | 125 | 5 |
| po | $Z_{405}$ | — | — | 100 | 8 |
| os | $Z_{383}$ | 130 | 10 | 95 | 10 |
| se | $Z_{473}$ | 140 | 20 | 75 | 10 |

Table 3

We can see in the Table 3: (1) for the letter pair 'po', the mean and standard deviation values are not determined in the trained model of user $U_1$, and (2) for the letter pair 'ur', the mean and standard deviation values are not determined in the trained model of user $U_2$. This is because, the letter pair 'po' and the letter pair 'ur' may have been observed less than two times in the training typing samples of user $U_1$ and in the training typing samples of user $U_2$, respectively. Therefore, we can see in the Table 4, an interval for the first bin of the feature corresponding to the letter pair 'po' is not determined in the model of user $U_1$ and an interval for the first bin of the feature corresponding to the letter pair 'ur' is not determined in the model of user $U_2$. Hence, these features are excluded from the probability estimate.

TABLE 4

Estimated interval (and probability) for the first bin of the extracted features in the trained models of two users:

| | | User $U_1$ | | | User $U_2$ | | |
|---|---|---|---|---|---|---|---|
| Feature | Feature number | Interval from | Interval to | Probability | Interval from | Interval to | Probability |
| pu | $Z_{411}$ | 114 | 126 | 0.80 | 110 | 150 | 0.80 |
| ur | $Z_{538}$ | 115 | 155 | 0.90 | — | — | — |
| rp | $Z_{458}$ | 66 | 114 | 0.95 | 115 | 135 | 0.95 |
| po | $Z_{405}$ | — | — | — | 84 | 116 | 0.85 |
| os | $Z_{383}$ | 110 | 150 | 0.85 | 75 | 115 | 0.95 |
| se | $Z_{473}$ | 100 | 180 | 0.70 | 55 | 95 | 0.80 |

To ascertain the identity of the user who might have typed the text "purpose" in the above example, we first select the features from $Z_1, Z_2, \ldots, Z_n$ such that an interval for the first bin of each selected feature is estimated in the model of user $U_1$ and in the model of user $U_2$. We can see in Table 4, an interval for the first bin of feature $Z_{538}$ and that of feature $Z_{405}$ are not determined in the models of both the users. Therefore, these features are not selected, and the remaining extracted features from the test typing sample, the common features present (i.e., $Z_{411}$, $Z_{458}$, $Z_{383}$, and $Z_{475}$) are selected to make a user identification decision, that is the total number of common features used is 4, and the total number of feature values used in the method for this test text is $\Sigma_{features\ present}(\text{number of feature values})=4$ For Example 2, the posterior probability of user $U_1$, that the extracted feature values from the test typing sample is generated from his (or her) model, is determined as follows. First, the extracted feature values that are selected to make an identification decision are discretized based on the estimated intervals in the model of user $U_1$. We can see that the extracted feature (see table 2): (1) the extracted feature value for the feature $Z_{411}$ (i.e., $z_{411}^1=135$) is discretized into the second bin, (2) the extracted feature value for the feature $Z_{458}$ (i.e., $z_{458}^1=95$) is discretized into the first bin, (3) the extracted feature value for the feature $Z_{383}$ (i.e., $z_{383}^1=107$) is discretized into the second bin, and (4) the extracted feature value for the feature $Z_{473}$ (i.e., $z_{473}^1=74$) is discretized into the second bin in the model of user $U_1$. Therefore, the probability value for user $U_1$ that test typing sample is generated from his (or her) model is determined as follows:

$$P(U_1/Z) = \frac{P(U_1)}{P(Z)} \times \prod_{j=1}^{n}\left(\prod_{t=1}^{m_j} P(z_j^t/U_1)\right)$$

$$= \frac{0.5}{P(Z)} \times \{P(z_{411}^1/U_1) \cdot P(z_{458}^1/U_1) \cdot P(z_{383}^1/U_1) \cdot P(z_{473}^1/U_1)\}$$

$$= \frac{0.5}{P(Z)} \times \{0.2 \times 0.95 \times 0.15 \times 0.30\}$$

$$= \frac{0.004275}{P(Z)}.$$

So $0.004275/P(Z)$ is the score for this users attempt compared to user $U_1$. Note in the above calculation, the $P(U_1)$ is 0.5 (as is $P(U_2)$) because both the registered users have provided the same number of training typing samples.

Similarly, the posterior probability of user $U_2$, that the extracted feature values from the test typing sample is generated from his (or her) model, is determined as follows. First, the extracted feature values that are selected to make an identification decision are discretized based on the estimated intervals in the model of user $U_2$. We can see: (1) the extracted feature value for the feature $Z_{411}$ (i.e., $z_{411}^1$) is discretized into the first bin, (2) the extracted feature value for the feature $Z_{458}$ (i.e., $z_{458}^1$) is discretized into the second bin, (3) the extracted feature value for the feature $Z_{383}$ (i.e., $z_{383}^1$) is discretized into the first bin, and (4) the extracted feature value for the feature $Z_{473}$ (i.e., $z_{473}^1$) is discretized into the first bin in the model of user $U_2$. Therefore, the probability value for user $U_2$ that test typing sample is generated from his (or her) model is determined as follows:

$$P(U_2/Z) = \frac{P(U_2)}{P(Z)} \times \prod_{j=1}^{n}\left(\prod_{t=1}^{m_j} P(z_j^t/U_1)\right)$$

$$= \frac{0.5}{P(Z)} \times \{P(z_{411}^1/U_2) \cdot P(z_{458}^1/U_2) \cdot P(z_{383}^1/U_2) \cdot P(z_{473}^1/U_2)\}$$

$$= \frac{0.5}{P(Z)} \times \{0.8 \times 0.05 \times 0.95 \times 0.80\}$$

$$= \frac{0.0152}{P(Z)}.$$

Among the two users of the user identification system, user $U_2$ has the highest posterior probability; hence, user $U_2$ is considered as the tentative identified authorized user for the test typing sample given in example 2. If the score (actually $P(U_2/Z)*P(Z)$) is "too low", then the user may be identified as neither U1 or U2, that is, the user is not an authorized user. To judge whether the probability is "too" low, one method would be to compare a minimum desired probability for each feature (say p=0.6), and calculate [(desired probability)(number of common test features values)], for instance, for the case of two uses with test text "purpose", the minimum threshold would be 0.64, or 0.6*0.6*0.6*0.6=0.1698693. For the above example, both $P(Ui/Z)*P(Z)i=1, 2$ are less than this minimum threshold probability product, and hence, the status of "non-authorized" user may be assigned to the tested user. Alternatively, the tentatively identified authorized user's expected probabilities (EP) for the particular letter pairs (i.e the probability for the letter pair to be within $\omega*\sigma_i$ for the selected $\omega$) could be used to form a product as a threshhold for comparison with the calculated value. For instance, in the two user example above, the expected probability would be $$\sum_{common\,Z_i} EP(Z_i) = [EP(Z_{411})*EP(Z_{458})*EP(Z_{383})*EP(Z_{473})] =$$

$$0.80*0.95*0.95*0.80 = 0.5776.$$

This expected probability may be modified to account for possible typing errors, for instance, by taking 70% of the product for comparison purposes.

In the event of a one-to-one situation, the user identifies himself/herself as a user, for instance, by logging into the system. The method can then be used to test the identified user against the stored user profile for that identified user. Again, a typing sample would be taken, and parameters extracted from the test typing sample for comparisons against the user profile identified with the login id. In this instance, the user would not be compared against all authorized users, but only the previously identified user. If the calculated score (here $P(U_*/Z)$ for the identified user) is determined to be too low (falling below a minimum threshold, for instance, less than $0.9*\Sigma_{common\,z_i}EP(Z_i)$) the method would indicate a mismatch between the identified user and that identified users typing profile. Based on the outcome of the comparison, decisions on how to deal with the user will be made (for instance, to deny the user access to a secured device or area).

Creation of an Authorized User Profile Using Similarity Method

Using the 'Similarity based user identification method', it is also preferred that outliers are detected and removed from the training data set. In the training phase of the 'Similarity method', an authorized user profile is created for each authorized user. For explanation purposes, the feature model is as before, with features values being key press latency with a total 676 features representing letter pairs. The profile parameters of an authorized user's model are estimated by determining the mean and standard deviation values from the recorded feature values of each feature in the user's training data. A user profile is represented by two vectors: (1) a vector containing the determined mean value for each of the n features i.e., $\mu=\{\mu_1,\mu_2,\ldots,\mu_{n-1},\mu_n\}$, and (2) a vector containing the determined standard deviation value for each of the n features i.e., $\sigma=\{\sigma_1,\sigma_2,\ldots,\sigma_{n-1},\sigma_n\}$.

Identification of a User Against the Similarity Created User Profiles

The objective of the user identification phase in this method for one to many comparison, is to identify a user from a set of users $U=\{U_1,U_2,\ldots,U_{N-1},U_N\}$ by assigning a similarity score to each of the users present in the set. A similarity score is assigned to a user given a set of vectors $Z=\{Z_1,Z_2,\ldots,Z_{n-1},Z_n\}$, where subscript n represents the total number of vectors (in our case, the value of n is set to 676). Note (1) $Z_1$ represents a vector containing the extracted feature values for the first feature (i.e., for letter pair 'aa') from a test typing sample, (2) $Z_2$ represents a vector containing the extracted feature values for the second feature (i.e., for letter pair 'ab') from a test typing sample, (3) $Z_{n-1}$ (in our case $Z_{675}$) represents a vector containing the extracted feature values for the $(n-1)^{th}$ feature (i.e., for letter pair 'zy') from a test typing sample, and (4) $Z_n$ (in our case $Z_{676}$) represents a vector containing the extracted feature values for the $n^{th}$ feature (i.e., for letter pair 'zz') from a test typing sample. Furthermore, each vector $Z_i=\{z_i^1,z_i^2,\ldots,z_i^{m_i}\}$, where (1) subscript i refers to an $i^{th}$ feature, (2) superscript $m_i$ represents the total number of times feature value for the $i^{th}$ feature is recorded from a test typing sample, and (3) $z_i^t$ represents the recorded feature value for the $i^{th}$ feature at the $t^{th}$ component position in the $Z_i$ vector. In this method, a trained authorized user profile consists of two vectors (1) a vector containing the mean value for each of the n features i.e., $\mu=\{\mu_1,\mu_2,\ldots,\mu_{n-1},\mu_n\}$, and (2) a vector containing the standard deviation value for each of the n features i.e., $\sigma=\{\sigma_1,\sigma_2,\ldots,\sigma_{n-1},\sigma_n\}$. Each authorized user profile is associated with the authorized user that created the trial typing tests.

To determine a similarity score for a user $U_i$, each feature value observed in is compared with the authorized user profile or trained model of $U_i$. A similarity score for user $U_i$ is determined using two measures: (1) "matching feature values"—a feature value $z_j^t$ is said to be a 'matching feature value', if the mean and standard deviation values are determined for the $j^{th}$ feature in the authorized user profile or trained model of $U_i$ (that is, the training data set contained more than one occurrence of the relevant non-outlier values used to create the relevant profile); and (2) "similar feature values"—a feature value $z_j^t$ is considered as 'similar feature value' to the model of a user $U_i$, if feature value $z_j^t$ falls within a feature interval $I_j=[\mu_j-\omega\cdot\sigma_j,\mu_j+\omega\cdot\sigma_j]$ (where $\mu_j$ and $\sigma_j$, respectively, represent the mean and standard deviation value for the $j^{th}$ feature in the model of user $U_i$). The inventors have found that $\omega=2$ is a preferred value, as it should capture ~98% of a authorized users input. Using these two measures, a similarity score $SS_{U_1}$ is assigned to user $U_i$ using the following equation:

$$SS_{U_1} = \frac{\text{Number of Similar Feature values}}{\text{Number of Matching Feature values}}. \quad \text{Equation 11}$$

The similarity score against a particular authorized user is thus the number of features values of the test typed text in the respective feature window for that user ("IN"), summed over all features ΣIN, divided the total number of feature values of the test typed text, both those in the interval and those outside of feature interval for a respective feature, summed over all features Σ(IN+OUT).

From the above equation, we can conclude that the highest similarity score that can be assigned to any user is 1 and the lowest similarity score that can be assigned to any user is 0. The authorized user whose similarity score is the highest, among the similarity scores assigned to each of the authorized users, is considered as the overall score for the tentatively identified user for the given test typing sample.

As discussed in the 'Competition between naïve Bayes models for user identification', we select features from $Z_1$, $Z_2$, ..., $Z_n$ such that an interval for the first bin of each selected feature is estimated in the naïve Bayes models of all the users to make an identification decision. That is, in the 'Competition between naïve Bayes models for user identification', we select extracted feature value for making an identification decision if it is considered as a matching feature value in the models of all the users. However in the user identification phase of the 'Similarity based user identification method', a similarity score is assigned to a user by finding how many matching feature values are observed in the model of that user only. This helps in using more, or at least the same, number of feature values for making an identification decision using the 'Similarity Method' when compared with the number of features selected for making an identification decision using the 'CNBM Method models for user identification'.

TABLE 5

| Extracted Feature (letter pair) | Extracted Feature value | User $U_1$ | | User $U_2$ | |
| --- | --- | --- | --- | --- | --- |
| | | Matching feature value | Similar feature value | Matching feature value | Similar feature value |
| pu | 135 | Yes | No | Yes | Yes |
| ur | 105 | Yes | No | No | — |
| rp | 105 | Yes | Yes | Yes | No |
| po | 90 | No | — | Yes | Yes |
| os | 107 | Yes | No | Yes | Yes |
| se | 74 | Yes | No | Yes | Yes |

To illustrate the user identification phase of this method, we use the prior example using the test typed text of the word "purpose" In the Table 5: (1) the first column and the second column, respectively, presents the extracted feature and its corresponding feature value from the test typing sample containing the text "purpose", (2) the third column and the fifth column, respectively, represents whether an extracted feature value can be considered as a 'matching feature value' in the model of user $U_1$ and in the model of user $U_2$, and (3) the fourth column and the sixth column, respectively, represents whether an extracted feature value can be considered as a 'similar feature value' in the model of user $U_1$ and user $U_2$. (Note if an extracted feature value from the test typing sample is not considered as a 'matching feature value' in the model of a user, then the feature value preferably is not used for making a decision on whether the feature value can be considered as a 'similar feature value' to the model of the user. Therefore, for such cases '-' is illustrated in the column corresponding to the 'similar feature value' in Table 5.)

We can see in the Table 5, feature values corresponding to letter pairs "pu", "ur", "rp", "os", and "se" are considered as the 'matching feature values' with respect to the model of the user $U_1$. Out of these five matching feature values, only one feature value corresponding to the letter pair "rp" is considered as 'similar feature value' with the model of the user $U_1$. Therefore, the similarity score assigned to user $U_1$ is $$SS_{U_1} = \frac{1}{5} = 0.2.$$

Similarly, we can see in the Table 5, feature values corresponding to letter pairs "pu", "rp", "po", "os", and "se" are considered as the 'matching feature values' with respect to the model of the user $U_2$. Out of these five matching feature values, only one feature value corresponding to the letter pair "rp" is considered as not a 'similar feature value' with the model of the user $U_2$. Therefore, the similarity score assigned to user $$U_2 \text{ is } SS_{U_2} = \frac{4}{5} = 0.8. \text{ As } SS_{U_2} > SS_{U_1},$$

user $U_2$ is the identified user for the test typing sample given in the Example 2. Again, if the match is not sufficient, (e.g. below a minimum threshold, for instance (for instance, SS<0.7), the user may be identified as "none of the authorized users", e.g. "non-authorized" user.

Evaluation of Performance

The performance of the two measures was evaluated on six data sets, as follows. Table 6 gives a description of each of the six datasets created from the typing samples collected in our keystroke dataset collection experiment. The first column of this table illustrates the number of typing samples selected in the training data of each user in a dataset. Based on the number of typing samples selected in the training data of each user in a dataset, a label (a dataset identifier) is assigned to the dataset (an assigned label to each dataset is given in the second column of the Table 6).

TABLE 6

| # Training samples per user | Dataset label | # Testing samples per user | # Sets | # Training samples per set | # Testing samples per set | Total number of testing samples |
|---|---|---|---|---|---|---|
| 1 | $Dataset_1$ | 14 | 15 | 1 × 10 = 10 | 14 × 10 = 140 | 140 × 15 = 2100 |
| 2 | $Dataset_2$ | 13 | 105 | 2 × 10 = 20 | 13 × 10 = 130 | 130 × 105 = 13650 |
| 3 | $Dataset_3$ | 12 | 455 | 3 × 10 = 30 | 12 × 0 = 120 | 120 × 455 = 54600 |
| 12 | $Dataset_{12}$ | 3 | 455 | 12 × 10 = 120 | 3 × 10 = 30 | 30 × 455 = 13650 |
| 13 | $Dataset_{13}$ | 2 | 105 | 13 × 10 = 130 | 2 × 10 = 20 | 20 × 105 = 2100 |
| 14 | $Dataset_{14}$ | 1 | 15 | 14 × 10 = 140 | 1 × 10 = 10 | 10 × 15 = 150 |

The third column of the Table 6 illustrates the number of typing samples are selected in the testing data of each user in a dataset. Note that each typing sample provided by a user is present in either training data or testing data of the user in a dataset. The selected typing samples in the training data of a user are used for creating a typing profile of the user. The created typing profile of each of the users is then employed to identify a user given a test typing sample. In other words, the selected typing samples in the training data forms the basis of user identification performance of a method. Therefore to see whether any change in the selected typing samples in the training data does have any effect on the user identification performance of the method, we create various sets for each dataset. The fourth column of Table 6 illustrates the number of sets are created for each dataset. These sets are created in such a way that each possible combination of the typing samples is selected in the training data of a dataset. For instance, if two typing samples are selected in the training data of a user in a dataset, then selecting any two typing samples out of 15 typing samples can be performed in $$^{15}C_2 = \frac{15!}{2! \cdot (15-2)!} = 105$$

possible ways. Therefore when two typing samples are selected in the training data of a user, total 105 sets are created for $Dataset_2$ (as shown in the fourth column of the third row in Table 6). The fifth column of Table 6 gives the number of typing samples selected as the training data in each set of a dataset. The number of typing samples selected as the training data in each set of a dataset is determined by multiplying the number of typing samples selected in the training data of a user (i.e., value in the first column of the table) with the number of users participated in the keystroke dataset collection experiment (i.e., 10 users). Similarly, the sixth column of the Table 6 gives the number of typing samples are selected as the testing data in each set of a dataset. The seventh column of the Table 6 gives the total number of typing samples selected as the testing data in a dataset. Each set of a dataset has the same number of typing samples as the testing data. Therefore, the total number of typing samples selected as the testing data in a dataset is determined by multiplying the total number of testing samples selected as the testing data in each set of a dataset with the number of sets created for the dataset.

The performance of both methods in accurately identifying users from experimental data sets is shown in table 7 (CNBM) and 8 (Similarity). These results are with outliers removed. TP=true positive (correct identification), FN=false negative (incorrect identification).

TABLE 7

| Dataset label | Total number of testing samples | Identifications #TP | Identifications #FN | Identification Accuracy |
|---|---|---|---|---|
| $Dataset_1$ | 2100 | 1882 | 218 | 89.62% |
| $Dataset_2$ | 13650 | 13400 | 250 | 98.17% |
| $Dataset_3$ | 54600 | 54213 | 387 | 99.29% |
| $Dataset_{12}$ | 13650 | 13602 | 48 | 99.65% |
| $Dataset_{13}$ | 2100 | 2092 | 8 | 99.62% |
| $Dataset_{14}$ | 150 | 149 | 1 | 99.33% |

We can also see in the Table 7, the performance of the method (in terms of identification accuracy) has shown improvement with an increase in the number of typing samples in the training data of a user. For example: (1) the identification accuracy of the method is improved by 8.55% when the typing samples in the training data of each user are increased from one to two; (2) the identification accuracy of the method is improved by 9.67% when the typing samples in the training data of each user are increased from one to three; and (3) the identification of the method is improved by 10.03% when the typing samples in the training data of each user are increased from one to twelve. One reason for such an improvement in the identification accuracy of the method could be the amount of data available for creating a typing profile of a user is increasing with an increase in the number of typing samples in the training data of the users. (We note that the identification accuracies of the method on $Dataset_{13}$ and $Dataset_{14}$ are marginally decreased by 0.03% and by 0.32% with respect to that obtained on $Dataset_{12}$.)

Figure 6:
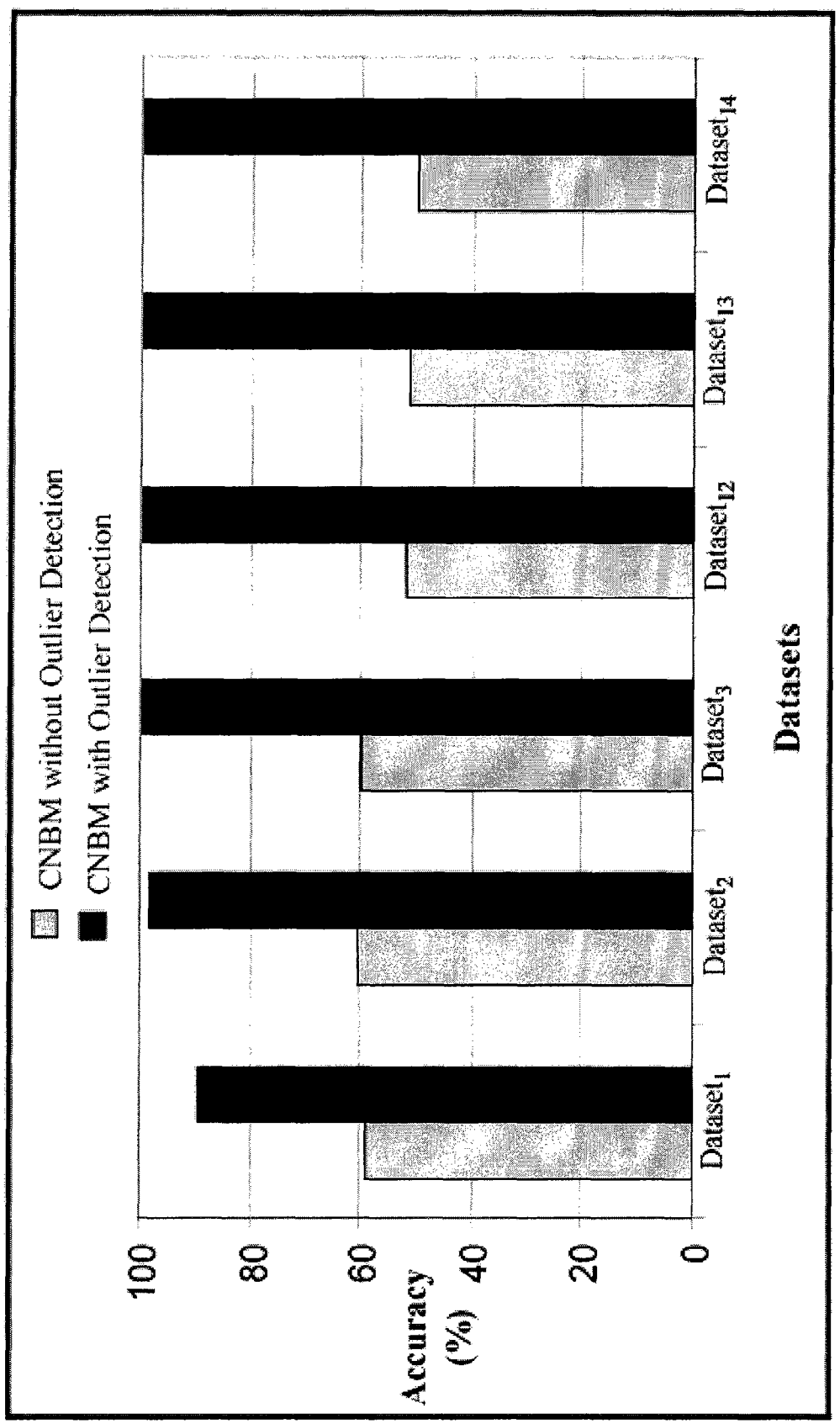
FIG. 6 is a bar graph showing performance of the CNBM method with and without outliers removed.

To compare the performance of the CNBM method when the outliers are not discarded from the training data and when the outliers are discarded from the training data, the obtained identification accuracies on each of the six datasets are plotted in FIG. 6.

Succinctly, discarding the data detected as outliers from the training data improved the accuracies (identification accuracies) on the six datasets ranging from 30.67% to 49.33%, with an average of 42.16% improvement on each dataset.

Next, we present the performance evaluation results of the 'Similarity based user identification method' on the six datasets.

Evaluation Results of the Similarity Based User Identification Method

Table 8 illustrates the performance evaluation results of the Similarity based user identification method.

TABLE 8

| Dataset label | Total number of testing samples | Identifications #TP | #FN | Identification Accuracy |
|---|---|---|---|---|
| $Dataset_1$ | 2100 | 2023 | 77 | 96.33% |
| $Dataset_2$ | 13650 | 13549 | 101 | 99.26% |
| $Dataset_3$ | 54600 | 54420 | 180 | 99.67% |
| $Dataset_{12}$ | 13650 | 13649 | 1 | 99.99% |
| $Dataset_{13}$ | 2100 | 2100 | 0 | 100.00% |
| $Dataset_{14}$ | 150 | 150 | 0 | 100.00% |

During this evaluation, outliers that are detected by the preferred distance based outlier detection method are discarded from the training data. Furthermore, the performance of the method (in terms of identification accuracy) has shown improvement with an increase in the number of typing samples in the training data of a user. For example: (1) the identification accuracy of the method is improved by 2.93% when the typing samples in the training data of each user are increased from one to two; (2) the identification accuracy of the method is improved by 3.34% when the typing samples in the training data of each user are increased from one to three; (3) the identification accuracy of the method is improved by 3.66% when the typing samples in the training data of each user are increased from one to twelve; and (4) the identification accuracy of the method is improved by 3.67% when the typing samples in the training data of each user are increased from one to thirteen and fourteen. As discussed earlier, one reason for such an improvement in the identification accuracy of the method could be the amount of data available for creating a typing profile of a user is increasing with an increase in the number of typing samples in the training data of the users.

From this analysis, we may conclude that the performance of the method observed on these datasets is almost constant with a change in the typing samples selected in the training data. (Note that on $Dataset_1$ the total number of true positives determined for its sets vary by 10 with a standard deviation of 2.77)

Figure 7:
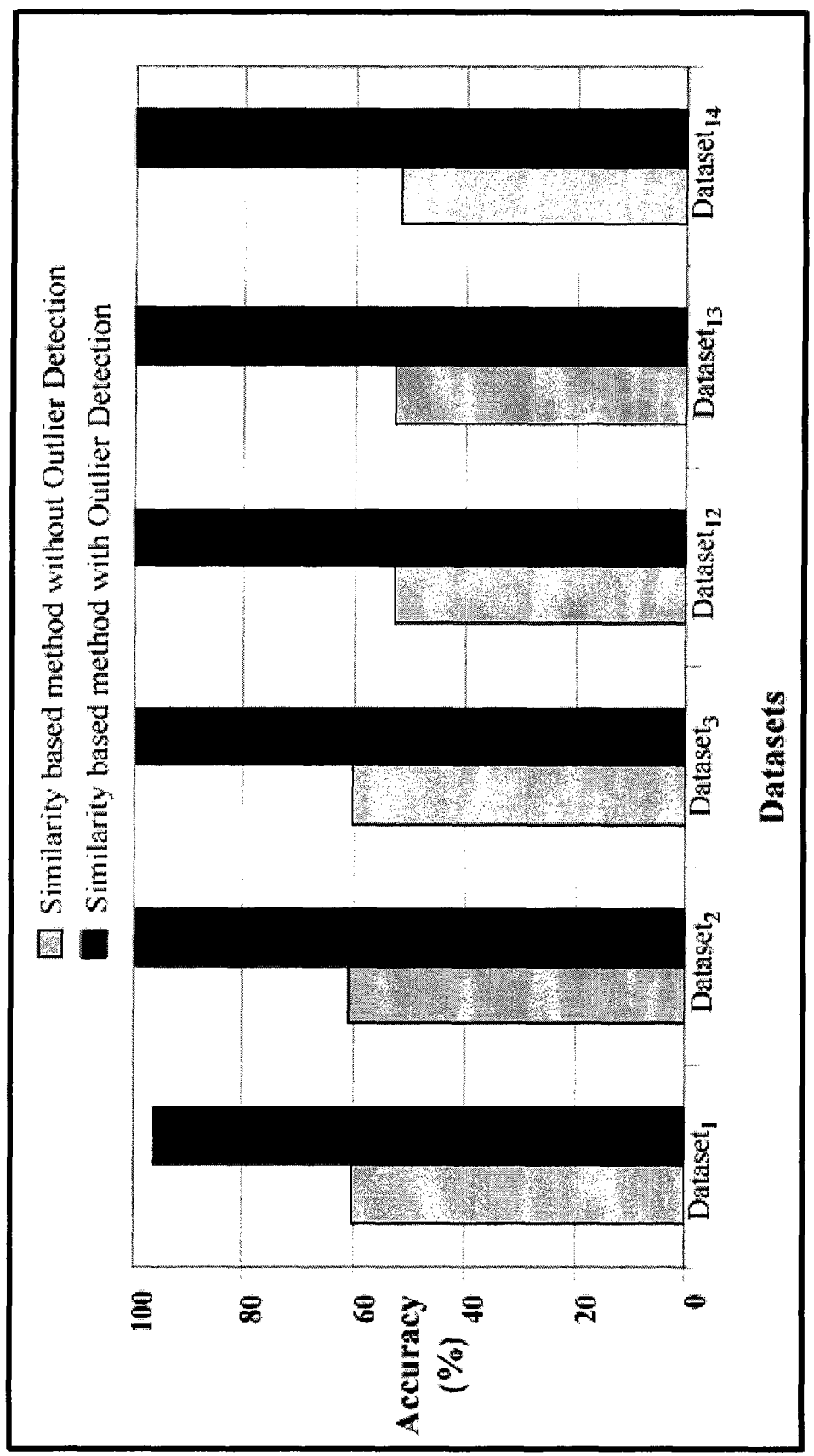
FIG. 7 is a bar graph showing performance of the Similarity Method with and without outliers removed.
Figure 8:
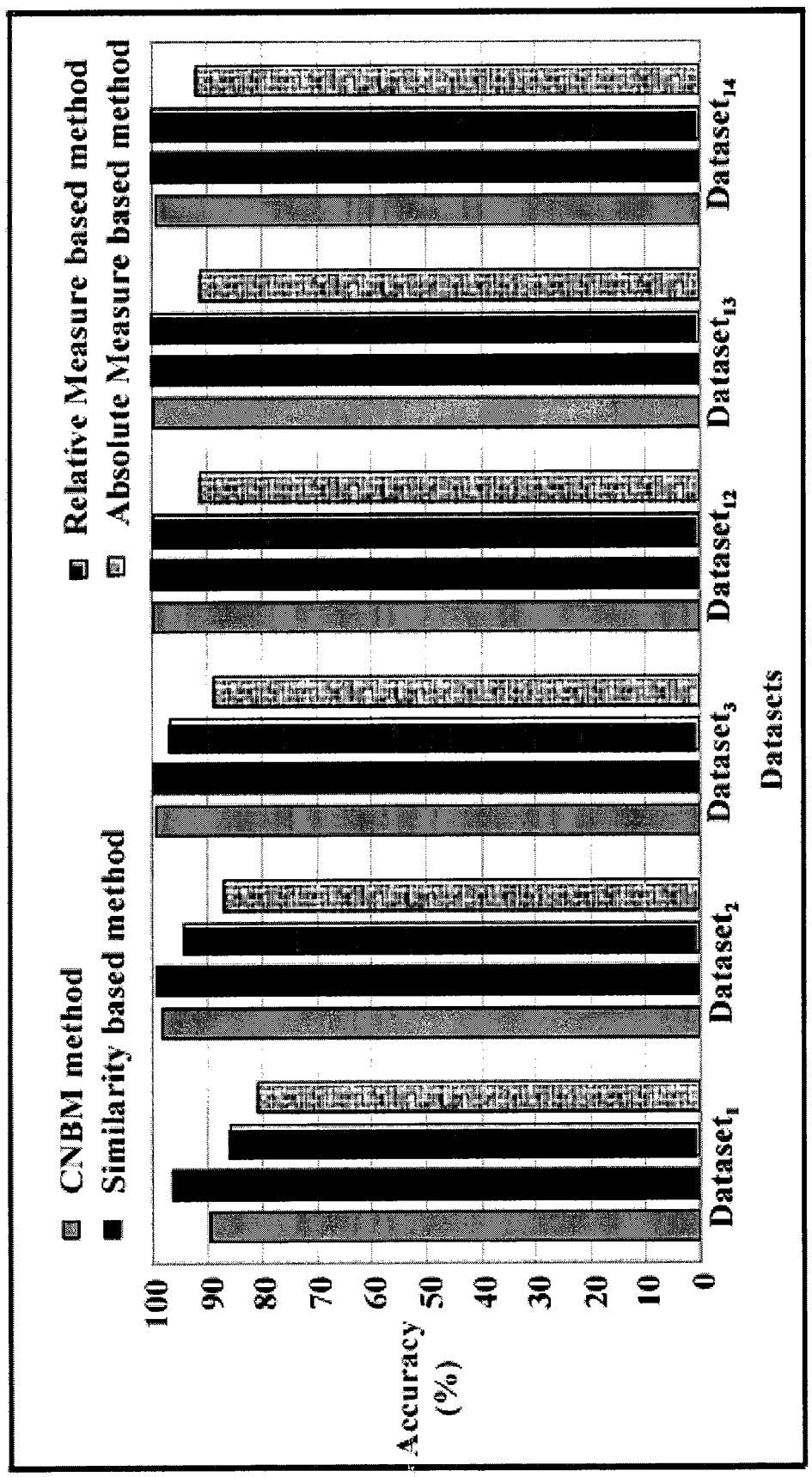
FIG. 8 is a bar graph showing performance of the Similarity Method and CNBM method against two other know methods.

To compare the performance of the Similarity based user identification method when the outliers are not discarded from the training data and when the outliers are discarded from the training data, the obtained identification accuracies on each of the six datasets are plotted in the FIG. 7. Succinctly, discarding the data detected as outliers from the training data improved the accuracies (identification accuracies) on the six datasets ranging from 35.66% to 48%, with an average of 42.53% improvement on each dataset.

Comparison with Other Methods

Next, the proposed two user identification methods are compared with that obtained by the user identification methods proposed recently by Bergadano et al. in Francesco Bergadano, Daniele Gunetti, and C. Picardi, *User authentication through keystroke dynamics*. ACM Transactions on Information and System Security (TISSEC), 2002. 5(4): p. 367-397; and by Gunetti and Picardi in Daniele Gunetti and C. Picardi, *Keystroke analysis of free text*. ACM Transactions on Information and System Security (TISSEC), 2005. 8(3): p. 312-347. Details of these two methods can be found the respective publications, hereby incorporated by reference. To compare the identification accuracies of the methods on the same keystroke dataset, we implemented the methods proposed by Bergadano (Relative Measure) and by Gunetti and Picardi (Absolute Measure). Here, the objective was to determine their respective identification accuracies on our six datasets.

In Table 9, the identification accuracies obtained on each of the six datasets by the CNBM and Similarity based user identification method are shown against the previous reported Absolute and Relative Measures. The obtained identification accuracies by each of the four user identification methods on each dataset are plotted in the FIG. 7. In the Table 9 and in the FIG. 7, a label is assigned to each dataset based on the number of typing samples selected in the training data of each user in the dataset. For example, a dataset with label $Dataset_1$ represents that one typing sample is selected in the training data of each user in the dataset.

TABLE 9

| Dataset label | CNBM method | Similarity based method | Relative measure based method | Absolute measure based method |
|---|---|---|---|---|
| $Dataset_1$ | 89.62% | 96.33% | 85.76% | 80.71% |
| $Dataset_2$ | 98.17% | 99.26% | 94.14% | 86.85% |
| $Dataset_3$ | 99.29% | 99.67% | 96.70% | 88.88% |
| $Dataset_{12}$ | 99.65% | 99.99% | 99.74% | 91.31% |
| $Dataset_{13}$ | 99.62% | 100.00% | 99.86% | 91.43% |
| $Dataset_{14}$ | 99.33% | 100.00% | 100.00% | 92.00% |

From these figures, we may conclude that: (1) the 'Similarity based user identification method' has attained the highest identification accuracy, among other three methods in comparison, over all the six datasets and attained 100% identification accuracy when the number of typing samples selected in the training data of each user are thirteen or fourteen; (2) the 'Relative measure based user identification method' attained the 100% identification accuracy only when the number of typing samples selected in the training data of each user are fourteen; and (3) the 'Absolute measure based user identification method' attained the lowest identification accuracy among other three methods in comparison over all the six datasets.

Fusion for User Identification

The primary objective of designing a user identification system is to achieve the best possible identification accuracy. In general, selection of one method from many competing methods, to build user identification system, is performed through empirical evaluation—the method with the highest identification accuracy is typically selected. However, in the pattern recognition literature, several studies have demonstrated that, although one method (or classifier) would yield the best recognition results, the patterns misclassified by the different classifiers would not necessarily overlap. In other words, fusing two or more classifiers may yield better recognition results than that obtained by single classifier.

We analyze fusing methods using one preferred embodiment, the 'Majority voting rule' (MVR), for performing classifier fusion. The MVR uses probabilities from several methods and combines these probabilities into a final probability. As used in the following, the probabilities may be considered scores, and the fusion method a method of combining multiple scores to produce a final probability or score.

Majority Voting Rule Based Classifier Fusion

Let us suppose, total n classifiers are designed for solving a pattern recognition problem and each classifier, given an input pattern, produces a unique decision regarding the identity of the input pattern. MVR assigns the input pattern to the class when at least k classifiers are agreed on the identity, where the value of k is determined using the following equation:

$$k = \begin{cases} \frac{n}{2} + 1, & n \text{ is even} \\ \frac{n+1}{2}, & n \text{ is odd.} \end{cases} \quad \text{Equation 12}$$

The provided decision by each of the n classifiers can be either correct or wrong and the decision provided by the MVR is wrong if, and only if, at least k classifiers make a wrong decision regarding the identity of the pattern. If the recognition rate (i.e., the probability value or score that the decision provided by the classifier might be correct) of a classifier is known, then it is easy to calculate the probability value that the decision provided by the classifier might be wrong. For example, if the recognition rate of a classifier is p, then the probability that the decision provided by the classifier might be wrong will be 1−p.

Similarly, the probability that the decision provided by the fusion of n classifiers using MVR, say $P_{MVR}(n)$, is correct can be estimated using the recognition rate or score of each of the n classifiers. In many studies, the value of $P_{MVR}(n)$ has been estimated under the following two assumptions: (1) the recognition rate of each of the n classifiers is the same and (2) all n classifiers are independent of each other. If the above two assumptions are satisfied, then $P_{MVR}(n)$ can be estimated using the following equation [83, 87]:

$$P_{MVR}(n) = \sum_{m=k}^{n} \binom{n}{m} p^m (1-p)^{n-m}, \quad \text{Equation 13}$$

where p is the recognition rate (or score) of each of the n classifiers and the value of k is determined using the equation 12. The following example illustrates the procedure for estimating the recognition rate of the MVR based fusion of three classifiers using equation 13.

Example 3: Let us suppose, three independent classifiers (n=3) has the same recognition rate or score, p=0.6, are to be fused using MVR. In this case, the value of $$k = \frac{n+1}{2} = \frac{3+1}{2} = 2$$

and then substituting n=3, k=2, and p=0.6 in the equation 13, we get $$P_{MVR}(3) = \sum_{m=2}^{n} \binom{3}{m} 0.6^m (1-0.6)^{3-m} = 0.648.$$

Therefore, fusion of these three classifiers using MVR might be beneficial as the recognition rate of the fusion is estimated to be higher than that obtained using individual classifier.

Note the assumption of each classifier having the same recognition rate cannot be expected to be always true in practice. If all the n classifiers do not have the same recognition rate, then the equation 13 cannot be used for estimating the recognition rate of the fusion of n classifiers using MVR. Not much research has been carried out in theoretically estimating the recognition rate of the fusion of n classifiers using MVR when the classifiers to be fused do not have the same recognition rate.

Next we examine estimating the recognition rate of the fusion of classifiers using MVR, irrespective of whether the classifiers to be fused have the identical recognition rate or not.

In this section, first, we theoretically estimate the recognition rate of the MVR based fusion of two classifiers, three classifiers, and four classifiers. Then based on the findings, we estimate the recognition rate of the MVR based fusion of n classifiers.

Estimation of the Recognition Rate of the Majority Voting Rule Based Fusion of Two Classifiers Let us suppose, two classifiers—$C_1$ and $C_2$—are to be fused using MVR, where the recognition rates of the two classifiers be $p_1$ and $p_2$, respectively. Given an input pattern, each classifier can make either correct or wrong decision regarding the identity of the pattern. Therefore, for an input pattern, the decisions provided by the classifiers $C_1$ and $C_2$ will fall into one of the possible $2^2=4$ decision vectors. (By 'decision vector' we mean a vector consisting of two components—(1) a decision provided by $C_1$ and (2) a decision provided by $C_2$.)

TABLE 10

| $C_1$ | $C_2$ | Decision vector | MVR($C_1$, $C_2$) |
|---|---|---|---|
| 1 | 1 | <1,1> | 1 |
| 1 | 0 | <1,0> | 0 |
| 0 | 1 | <0,1> | 0 |
| 0 | 0 | <0,0> | 0 |

The possible four decision vectors when two classifiers are fused are given in the third column of the Table 10. In Table 10, note the following: (1) number '1' represents that the correct decision is provided by the classifier; (2) number '0' represents that the wrong decision is provided by the classifier; and (3) MVR($C_1$,$C_2$) represents the decision provided by fusing the decisions received from two classifiers using MVR. We can see in the Table 10 that fusion of two classifiers using MVR makes correct decision only on 1 decision vector <1,1> and on the remaining decision vectors MVR based fusion makes wrong decision. Hence, decision vector <1,1> is the only decision vector which is useful for estimating the recognition rate of the fusion of two classifiers using MVR. Subsequently, the recognition rate of the fusion of two classifiers using MVR, say $P_{MVR}(C_1,C_2)$, can be estimated as follows:

$$P_{MVR}(C_1,C_2) = P(C_1=1, C_2=1) \quad \text{Equation 14}$$

Under the assumption that both the classifiers are independent of each other, equation 14 can be written as:

$$\begin{aligned} P_{MVR}(C_1, C_2) &= P(C_1=1, C_2=1) \\ &= P(C_1=1) \cdot P(C_2=1) \\ &= p_1 \cdot p_2 \end{aligned} \quad \text{Equation 15}$$

From equation 15, we may conclude that the recognition rate of the fusion of two classifiers using MVR will not be higher than that of the recognition rate of the individual classifier. This is because, $P_{MVR}(C_1,C_2)=p_1 \cdot p_2$ and the recognition rates $p_1$ and $p_2$ lies between 0 and 1. Mathematically, this relationship can be given as:

$$P_{MVR}(C_1,C_2)=p_1 \cdot p_2 \leq p_j, j=1 \text{ or } 2 \quad \text{Equation 16}$$

Estimation of the Recognition Rate of the Majority Voting Rule Based Fusion of Three Classifiers Let us suppose, three classifiers—$C_1$, $C_2$, and $C_3$—are to be fused using MVR, where the recognition rates of the three classifiers be $p_1$, $p_2$ and $p_3$, respectively. Given an input pattern, each of these three classifiers can make either correct or wrong decision regarding the identity of the pattern. Therefore, for an input pattern, the decisions provided by $C_1$, $C_2$, and $C_3$ will fall into one of the possible $2^3=8$ decision vectors. (By 'decision vector' we mean a vector consisting of three components—(1) a decision provided by $C_1$, (2) a decision provided by $C_2$, and (3) a decision provided by $C_3$.) The possible 8 decision vectors when three classifiers are fused are given in the fourth column of Table 11. In Table 11, note the following: (1) number '1' represents that the correct decision is provided by the classifier; (2) number '0' represents that the wrong decision is provided by the classifier; and (3) MVR($C_1,C_2,C_3$) represents the decision provided by fusing the decisions received from the three classifiers using MVR.

TABLE 11

| $C_1$ | $C_2$ | $C_3$ | Decision vector | MVR($C_1$, $C_2$, $C_3$) |
|---|---|---|---|---|
| 1 | 1 | 1 | <1,1,1> | 1 |
| 1 | 1 | 0 | <1,1,0> | 1 |
| 1 | 0 | 1 | <1,0,1> | 1 |
| 0 | 1 | 1 | <0,1,1> | 1 |
| 0 | 0 | 0 | <0,0,0> | 0 |
| 0 | 0 | 1 | <0,0,1> | 0 |
| 0 | 1 | 0 | <0,1,0> | 0 |
| 1 | 0 | 0 | <1,0,0> | 0 |

We can see in Table 11 that fusion of three classifiers using MVR makes correct decision on four decision vectors—<1,1,1>, <1,1,0>, <1,0,1>, <0,1,1>—and on the remaining four decision vectors MVR based fusion makes wrong decision. Hence, the four decision vectors mentioned above are useful for estimating the recognition rate of the fusion of three classifiers using MVR. Subsequently, the recognition rate of the fusion of three classifiers using MVR, say $P_{MVR}(C_1,C_2,C_3)$, can be estimated as follows:

$$P_{MVR}(C_1,C_2,C_3)=P(C_1=1,C_2=1,C_3=1)+P(C_1=1,C_2=1,C_3=0)+P(C_1=1,C_2=0,C_3=1)+P(C_1=0,C_2=1,C_3=1) \quad \text{Equation 17}$$

Under the assumption that all the three classifiers are independent of each other, equation 17 can be written as:

$$P_{MVR}(C_1,C_2,C_3)=(p_1p_2p_3)+(p_1p_2(1-p_3))+(p_1(1-p_2)p_3)+((1-p_1)p_2p_3) \quad \text{Equation 18}$$

Simplifying $$P_{MVR}(C_1,C_2,C_3)=(p_1p_2)+(p_1p_3)+(p_2p_3)-(2p_1p_2p_3) \quad \text{Equation 19}$$

Fusion of these three classifiers using MVR could be beneficial as the recognition rate of the fusion is estimated to be higher than that obtained by the individual classifiers $C_1$, $C_2$, and $C_3$.

The analysis of fusing four classifiers—$C_1$, $C_2$, $C_3$ and $C_4$. Fusion of four classifiers using MVR makes correct decision on the following five decision vectors—<1,1,1,1>, <1,1,1,0>, <1,1,0,1>, <1,0,1,1>, <0,1,1,1>—(and on the remaining possible decision vectors MVR based fusion makes wrong decision). Therefore, the five decision vectors mentioned above are useful for estimating the recognition rate of the fusion of four classifiers using MVR. Subsequently, the recognition rate of the fusion of four classifiers using MVR, say $P_{MVR}(C_1,C_2,C_3,C_4)$, can be estimated as follows:

$$P_{MVR}(C_1,C_2,C_3,C_4)=P(C_1=1,C_2=1,C_3=1,C_4=1)+P(C_1=1,C_2=1,C_3=1,C_4=0)+P(C_1=1,C_2=1,C_3=0,C_4=1)+P(C_1=1,C_2=0,C_3=1,C_4=1)+P(C_1=0,C_2=1,C_3=1,C_4=1)$$

Under the assumption that all the four classifiers are independent of each other, $P_{MVR}(C_1,C_2,C_3,C_4)$ can be written as:

$$P_{MVR}(C_1, C_2, C_3, C_4) = \quad \text{Equation 20}$$
$$(p_1p_2p_3p_4) + (p_1p_2p_3(1-p_4)) + (p_1p_2(1-p_3)p_4) +$$
$$(p_1(1-p_2)p_3p_4) + ((1-p_1)p_2p_3p_4) =$$
$$(p_1p_2p_3) + p_1p_2(1-p_3)p_4 + p_1(1-p_2)p_3p_4 +$$
$$(1-p_1)p_2p_3p_4 = p_1p_2p_3 +$$
$$p_4(p_1p_2(1-p_3) + p_1(1-p_2)p_3 + (1-p_1)p_2p_3)$$

Fusion of four classifiers using MVR might not be beneficial as the recognition rate of the fusion is estimated to be lower than that obtained by some of the the individual classifiers. This can be seen by assuming after the addition of the fourth classifier i.e., $C_4$ to the ensemble of three classifiers, the recognition rate of the MVR based fusion does not decrease. Therefore, we have $$P_{MVR}(C_1,C_2,C_3,C_4) \geq P_{MVR}(C_1,C_2,C_3) \quad \text{Equation 21}$$

Substituting equations 18 and 20 in equation 21, we have $$p_1p_2p_3+p_4(p_1p_2)(1-p_3)+p_1(1-p_2)p_3+(1-p_1)p_2p_3)$$
$$\geq p_1p_2p_3+p_1p_2(1-p_3)+p_1(1-p_2)p_3+(1-$$

Subtracting $p_1p_2p_3$ from both the sides, we have $$p_4(p_1p_2(1-p_3)+p_1(1-p_2)p_3+(1-p_1)p_2p_3) \geq p_1p_2(1-p_3)+p_1(1-p_2)p_3+(1-p_1)p_2p_3$$

Assume $p_1p_2(1-p_3)+p_1(1-p_2)p_3+(1-p_1)p_2p_3 \neq 0$ and dividing both the sides by this term, we have $$p_4 \geq 1 \quad \text{Equation 22}$$

Therefore, $P_{MVR}(C_1,C_2,C_3,C_4) \geq P_{MVR}(C_1,C_2,C_3)$ will be satisfied if, and only if, $p_4 \geq 1$. However, $p_4$ being the recognition rate it can have value ranging from 0 to 1, but not greater than 1. Therefore, we may conclude that the recognition rate obtained after adding one more classifier to the ensemble of three classifiers will not be higher than that of the ensemble of the same three classifiers.

Let us suppose, n classifiers—$C_1,C_2, \ldots, C_n$—are to be fused using MVR, where the recognition rates of the classifiers be $p_1,p_2, \ldots, p_n$, respectively. Given an input pattern, each of these n classifiers can make either correct or wrong decision regarding the identity of the pattern. Therefore, for an input pattern, the decisions provided by each of the classifiers will fall into one of the possible $2^n$ decision vectors. The MVR based fusion of these n classifiers, MVR($C_1, C_2, \ldots, C_n$), will make correct decision if at least k of the classifiers have made correct decision regarding the identity of the pattern (the value of k can be determined using equation 8.1). Therefore, the total number of decision vectors consisting of at least k correct decisions will be $$\sum_{m=k}^{n} \binom{n}{m} = \binom{n}{k} + \binom{n}{k+1} + \ldots + \binom{n}{n}.$$

Let $=\{D_1,D_2, \ldots, D_N\}$ where (1) N represents the total number of decision vectors on which MVR($C_1,C_2, \ldots, C_n$) makes correct decision.

$$\left(\text{i.e., } N = \sum_{m=k}^{n} \binom{n}{m}\right) \text{ and (2) each } D_i = \{d_i^1, d_i^2 \ldots, d_i^n\},$$

where each $d_i^j$ represents the decision (either correct or wrong) provided by a $j^{th}$ classifier in the decision vector $D_i$. (Note $d_i^j$ can have value either '1' or '0'. Value '1' represents that the correct decision is provided by a $j^{th}$ classifier and value '0' represents that the wrong decision is provided by a $j^{th}$ classifier in the $i^{th}$ decision vector.) Then, the recognition rate of the MVR based fusion of n classifier, say $P_{MVR}(C_1, C_2, \ldots, C_n)$, can be given as:

$$P_{MVR}(C_1, C_2, \ldots, C_n) = \sum_{i=1}^{N} \prod_{j=1}^{n} \chi(d_i^j), \quad \text{Equation 23}$$

where $$\chi(d_i^j) = \begin{cases} p_j, & d_i^j = 1 \\ 1 - p_j, & d_i^j = 0 \end{cases}$$

Because the rule for fusion is the majority rule, fusion of an even number of classifiers generally will not be an improvement over some of the individual classifiers, while fusion of an odd number generally will show an improvement over the individual classifiers.

Table 12 presents the identification accuracies obtained on each of the six datasets by four methods: (1) CNBM (referred as "$C_1$"), (2) Similarity based user identification method (referred as "$C_2$"), (3) Relative measure based user identification method (referred as "$C_3$"), and (4) Absolute measure based user identification method (referred as "$C_4$"). Table 12 also gives the theoretically estimated identification accuracies when (1) the methods $C_1$, $C_2$, $C_3$, and $C_4$ are fused using MVR, (2) the methods $C_1$, $C_2$, and $C_3$ are fused using MVR, and (3) the methods $C_1$, $C_2$, and $C_4$ are fused using MVR. To illustrate the procedure for estimating the identification accuracy of the MVR based fusion of user identification methods, we estimate the identification accuracy of MVR($C_1,C_2,C_3$) and MVR($C_1,C_2,C_3,C_4$) on a dataset in the following two examples.

TABLE 12

| Method | Dataset$_1$ | Dataset$_2$ | Dataset$_3$ | Dataset$_{12}$ | Dataset$_{13}$ | Dataset$_{14}$ |
|---|---|---|---|---|---|---|
| $C_1$ | 89.62% | 98.17% | 99.29% | 99.65% | 99.62% | 99.33% |
| $C_2$ | 96.33% | 99.26% | 99.67% | 99.99% | 100.00% | 100.00% |
| $C_3$ | 85.76% | 94.14% | 96.70% | 99.74% | 99.86% | 100.00% |
| $C_4$ | 80.71% | 86.85% | 88.88% | 91.31% | 91.43% | 92.00% |
| MVR ($C_1,C_2,C_3,C_4$) | 93.16% | 98.77% | 99.49% | 99.94% | 99.95% | 99.95% |
| MVR ($C_1,C_2,C_3$) | 97.73% | 99.84% | 99.96% | 100% | 100% | 100% |
| MVR ($C_1,C_2,C_4$) | 97.06% | 99.65% | 99.88% | 99.97% | 99.97% | 99.95% |

$C_1$: CNBM method
$C_2$: Similarity based user identification method
$C_3$: Relative measure based user identification method
$C_4$: Absolute measure based user identification method

TABLE 13

| Method | Dataset$_1$ | Dataset$_2$ | Dataset$_3$ | Dataset$_{12}$ | Dataset$_{13}$ | Dataset$_{14}$ |
|---|---|---|---|---|---|---|
| MVR ($C_1,C_2,C_3,C_4$) | 90.09% | 97.33% | 198.81% | 100% | 100% | 100% |
| MVR ($C_1,C_2,C_3$) | 96.52% | 99.40% | 99.72% | 100% | 100% | 100% |
| MVR ($C_1,C_2,C_4$) | 95.62% | 99.20% | 99.66% | 100% | 100% | 100% |

$C_1$: CNBM method
$C_2$: Similarity based user identification method
$C_3$: Relative measure based user identification method
$C_4$: Absolute measure based user identification method Table 13 gives the obtained identification accuracy of the MVR based fusion of (1) $C_1$, $C_2$, $C_3$, and $C_4$; (2) $C_1$, $C_2$, and $C_3$; and (3) $C_1$, $C_2$, $C_3$, and $C_4$ on the six datasets.

We can see in Table 12 and Table 13: (1) the identification accuracy of the MVR based fusion of three user identification methods (MVR($C_1,C_2,C_3$) and MVR($C_1,C_2,C_4$)) is higher than that of the MVR based fusion of four user identification methods (i.e., MVR($C_1,C_2,C_3,C_4$)) on all the six datasets. In other words, the identification accuracy of the MVR based fusion of four user identification methods is less than that of the MVR based fusion of three user identification methods on all the six datasets; (2) the identification accuracy of MVR ($C_1,C_2,C_3$) is higher than, or at least the same, that of the other two fusions—MVR($C_1,C_2,C_3,C_4$) and MVR($C_1,C_2,C_4$)—on all six datasets; and (3) the identification accuracy of the MVR($C_1,C_2,C_3$) is higher than, or at least the same, that of the individual user identification methods $C_1$, $C_2$, and $C_3$ on all the six datasets. In general, because the rule is a majority based rule, using an odd number of methods to fuse will generally produce better results than when using an even number of rules.

As can be seen, the MVR is best applied with an odd number of scores or probabilites (each an estimate that the user is an authorized user from a separate method). However, if an even number of estimates or scores is provided, the best combination of these scores, taking an odd number at at a time, may be used to determine which set of estimators (the set containing an odd number of scores) produces the higest fused MVR score. That is, equation 23 is utilized using combinations of odd numbers of scores.

For instance, if six estimates or scores (pi, p2, p2, p4, p5, p6) are provided, calculate, using equation 23, the possibilities for five scores by computing $P_{MVR}$(p1,p2,p3,p4,p5); $P_{MVR}$(p1,p2,p3,p4,p6); $P_{MVR}$(p1,p2,p3,p5,p6); $P_{MVR}$(p1,p2,p4,p5,p6); $P_{MVR}$(p1,p3,p4,p5,p6); $P_{MVR}$(p2,p3,p4,p5,p6) and choose as the fused score as the $P_{MVR}$ that is the largest—this provides the best combination of five out of six scores.

Also, you can compute the best combination of three scores out of six by examining the $$\frac{n!}{r!(n-r)!} = \binom{n}{r}$$

combinations of three scores calculated using equation 23, using the largest score from these possibilities as the best fusion of three scores. A final score may be derived by comparing the best score of three with the best score of five, choosing the largest, and comparing this "final score" against the threshold value.

Summary

The method of user identification described includes collecting a trial typing sample set for each authorized user, and creation of a user profile from the trial data set. The user profile characteristics will depend on the method selected to compare a test sample, e.g. the CBNM method or similarity method. A user for whom identification/authorization is needed, provides a test sample. Features are extracted from this test sample and compared against the stored user profiles for purposes of identification. Based upon the comparison, the user will be identified, and may include identification as a non-authorized user. The method can be deployed in a variety of settings, and preferably, the type of keyboard or input typing device used to collect the test samples is comparable to the type of keyboard used for creation of the training data sets.

Preferably, the training data sets are created by the users using non-fixed text, that is, the text given to the users to duplicate varies. The method can be employed on a system for access to an area, computer, computer site (e.g. allow access to a web site—verify user based upon the typed text of the web address), or any other device/area where security is an issue. After creation of a user profile, the site may be deployed on a specific apparatus (e.g. laptop, local machine providing access to a building, etc), or on a computer system remotely communicating with an input text device, that is tied to an access point (e.g. building, door, laptop, other device for which the user is requesting authorization to use). The system will first verify the identify of the user, and once identified, determine if the user is authorized for the action requested (for instance, access to a particular file, drive data-area, building, device, etc).

Preferably, the test sample data to be replicated by the user is again arbitrary text, but can be a fixed test, such as user id. While not preferred, fixed test sample text may be used, but the trial sample text should preferably still be non-fixed text (e.g. free text).

The system may be deployed to identify a user from among a group of users (many-to-one), or to verify a users status based upon other user ID information (such as log in information, fingerprint information, etc). Additionally, the system can periodically or continuously monitor typed text to confirm the identify of a user who was earlier provided access. For instance, if a user is provided access to a first area of the building, the user may be required to provide another test typing sample to access another more secure area of a building, where the second access point requires a better match between the test sample and user profiles than required by the first access point.

Finally, the preferred methods using free text (similarity and CNBM) may be combined with other typed text matching criteria, such as the Relative Measure (proposed by Bergadano), or Absolute Measure (proposed by Gunetti and Picardi) to make the combination of methods more robust than use of a single method. The preferred method of combining multiple identification methods is the majority voting rule.

As described, the method is intended for implementation on a computer system, having at least a processor, a database or memory for storing authorized user profiles, an input station having a display device and a text input device such as a keyboard. The method may be used to always identify a user as one of a set of authorized users (e.g. no identification as a non-authorized user, in which event the assigned score preferably is not tested against a threshold) or the method may alternatively be used to identify the tested user as a non-authorized user (in which event the assigned score is compared to a threshold). The method is preferably used with the user typing a test sample of free text, but the method also works with the user typing a fixed text string. However, because a fixed text string is more readily subject to impersonation, free text is preferred. The method may be user to confirm the identity of a previously identified user, or to test the identity of a user who was not previously identified. For instance, on a system that does not require a user login or user identification, a user accessing the system may be monitored for identification purposes—for instance, when a user is typing in a chat room, a blog (such as Facebook), or emails, or any type of "on the fly" correspondence where text is input, the users identidy can be monitored or checked, as long as the relevant keystroke timing data can be extracted from the text for purposes of the method.

For instance, an authorized user's laptop or desktop may have the keystroke extraction code resident and running in the background unbeknownst to the user. Hence, when a user of the laptop sends email or attaches a document to the email, the background keystroke timing data extraction program can extract relevant timing data and attach the feature vectors to the email for analysis at a remote site (alternatively, the analysis may be done on the laptop itself, and the score transmitted, or the identification confirmation transmitted) with the email as an attachment that is transparent (e.g. hidden data or a hidden attachment) to the user (possibly send in a separate email to the third party addressee (the extra email message may be more readily detected). In this fashion, the party receiving the email can confirm or test the identity of the email composer to verify the identity of the sender. For instance, if an email was sent from such a user's desktop and the feature vectors, score, etc., are not attached to the email, the party receiving the email has a direct indicator that the email was not sent from the authorized user's machine, simply because the hidden data is not attached. If the hidden data is attached, it can be tested or check for user status as an authorized user.

The invention claimed is:

1. A method for identifying a user as one from a series of authorized users from free typed text, comprising the steps of (1) retrieving stored typing profiles for a series of authorized users $\{U_k\}$ from a data storage device, each authorized user typing profile associated with a single authorized user and containing a set of trial values derived from feature measured values from said trial typing sample received from said associated authorized user, each of said trial values being associated with one feature from a set of predefined features $\{Z_i\}$; (2) receiving a test typing sample of free alpha-numeric text from a text input terminal, where said free alpha-numeric text comprises a string of text characters that is not a fixed string of text characters; (3) extracting a subset of features Z from said received test typing sample, each extracted feature $Z_i$ in said subset Z having a set of non null test values derived from said extracted feature; (4) then for each authorized user profile, determining which features in said associated authorized user profile are common with said extracted features, and comparing said common extracted feature test values to said common authorized user typing profiles feature trial values to derive an authorized user score associated with said authorized user, wherein said authorized user score, for each authorized user $U_k$, is proportional to a conditional probability estimate, $P(U_k/Z)$ that the authorized user $U_k$ generated the test values associated with said set of extracted features Z; (5) associating said test typing sample with one of said authorized users based on said authorized user scores, or with none of said authorized users if all of said authorized user test scores fail a predetermined test.

2. The method of claim 1 wherein, prior to receiving said test typing sample, a sample free text string is sent to a display unit associated with said text input terminal for replication by a user, wherein said test typing sample received is the user's attempted replication of said sample free text string.

3. The method of claim 1 wherein said features comprise a subset of pairs of adjacent alpha-numeric characters.

4. The method of claim 3 wherein said feature measured values and said test values comprise values associated with key latency times between said adjacent alpha-numeric characters.

5. The method of claim 1 wherein said step of associating said test typing sample with one of said authorized users based on said authorized user scores, results in no more than one of said authorized users being associated with said test typing scores.

6. The method of claim 1 wherein said trial values of said features of said authorized user $U_j$'s authorized user typing profile comprises, a mean $\mu_j$ and a standard deviation $\sigma_j$, derived from said feature measured values in said trial typing sample from the associated authorized user, $U_j$.

7. The method of claim 1 wherein each said feature comprises a specific pair of adjacent alpha-numeric letters.

8. The method of claim 7 wherein for each feature in each said authorized user typing profile, the trial values of the feature comprises, a feature interval $I_j$ centered about a mean $\mu_j$ of the feature values associated with the $j^{th}$ feature for the associated authorized user, as measured in the trial typing sample, and an estimated probability $AP_j$ that a feature value will be within a said associated feature interval.

9. The method of claim 8 wherein said authorized user score, for each authorized user $U_k$, estimating $P(U_k/Z)$ further comprises the steps of, (a) for each extracted feature $Z_i$ in the set of extracted features Z, estimating the conditional probability $P(Z_i/U_k)$ that the test values associated with said extracted feature $Z_i$ were generated by said authorized user $U_k$, (b) computing the product of all said estimated conditional probabilities derived from step (a) for all said extracted features.

10. The method of claim 1 further wherein the authorized user to be associated with said test typing sample is that authorized user having the maximum authorized user score.

11. The method of claim 1 wherein each said authorized user typing profile is derived from features comprising alpha-numeric character pairs extracted from the said trial typing sample from the associated authorized user, wherein said authorized user trial typing sample is processed to remove outlier feature measured values prior to derivation of said authorized user profile.

12. The method of claim 11 wherein outlier feature measured values are identified by the steps of, for each feature: (i) determine a neighborhood for each feature measured value; (ii) for each feature measured value, determine the number of neighbors in said feature measured value neighborhood; and for each measured feature value (iii) remove said feature measured value from said training data set if the number of neighbors of said feature measured value is less than a predetermined quantity.

13. A method of claim 1 further comprising the steps of deriving a second score that the user is an authorized user combining said authorized user score and said second score to derive a final score that the user is an authorized user.

14. A method for identifying a user as one from a series of authorized users from free typed text, comprising the steps of (1) retrieving stored typing profiles for a series of authorized users $\{U_k\}$ from a data storage device, each authorized user typing profile associated with a single authorized user and containing a set of trial values derived from feature measured values from said trial typing sample received from said associated authorized user, each of said trial values being associated with one feature from a set of predefined features $\{Z_i\}$; (2) receiving a test typing sample of free alpha-numeric text from a text input terminal, where said free alpha-numeric text comprises a string of text characters that is not a fixed string of text characters; (3) extracting a subset of features Z from said received test typing sample, each extracted feature $Z_i$ in said subset Z having a set of non null test values derived from said extracted feature; (4) then for each authorized user profile, determining which features in said associated authorized user profile are common with said extracted features, and comparing said common extracted feature test values to said common authorized user typing profiles feature trial values to estimate a similarity $S_k$ of said extracted features Z to the corresponding authorized user profile and establishing an authorized user score for the corresponding authorized user $U_k$ to be proportional to said estimated similarity $S_k$; (5) associating said test typing sample with one of said authorized users based on said authorized user scores, or with none of said authorized users if all of said authorized user test scores fail a predetermined test, wherein said estimated similarity $S_k$ is derived by: (a) for each feature $Z_j$ in said extracted set of features Z, (i) determine the number $IN_j$ of test values for said feature $Z_j$ that lie within a feature interval $I_j=[\mu_i-\omega\sigma_i, \mu_i+\omega\sigma_i]$ where $\mu_j$ and $\sigma_j$, respectively, represent the mean and standard deviation of the trial values associated with the corresponding feature in the associated authorized user profile and $\omega$ represents a predefined number, (ii) determine the number $OUT_j$ of test feature values that lie outside said feature window $I_j$; (b) calculate IN, the sum of all $IN_j$ derived from step (a)(i); (c) calculate OUT, the sum of all OUTj derived from step (a)(ii); (d) set $S_k$ to be proportional to IN/(IN+OUT).

15. The method of claim 14 wherein the authorized user to be associated with said test typing sample is that authorized user having the maximum authorized user score.

16. A system for providing access to a secured point to authorized users comprising a data input station comprising a terminal for inputting text, and a display for displaying text, a computer system comprising a processor in communication with said data input station, a database in communication with said computer system, said database having stored thereon an authorized user typing profile for each authorized user Uk from a set of authorized users $\{U_k\}$, where each said authorized user typing profile contains a set of trial values, each of said trial values being associated with one feature from a set of predefined features $\{Z_j\}$; said computer system adapted to display a free text on said display, where said displayed free text is not a fixed string of text characters and to receive a user's attempted replication on said text input device of said displayed free text, said system processor configured to extract a set of features Z from said attempted replication of free text, each of said extracted features in said set having test values, said processor further configured to compare said extracted feature's test values to a selected one of said authorized user typing profiles where said comparison comprises determining which features in said selected authorized user typing profile are common with said extracted features, and comparing said common extracted feature test values to said common selected authorized user typing profile feature trial values to derive an authorized user score associated with said selected authorized user typing profile and identifying said user's attempted replication as generated by one of said authorized users if said authorized user score falls within a pre-defined range of values, and providing access to said secured point if said user's attempted replication is identified as generated by one of said authorized users, where said authorized user score is proportional to either:

(I) a conditional probability estimate, $P(U_k/Z)$ that the authorized user $U_k$ generated the test values associated with said set of extracted features Z; or, (II) an estimated similarity $S_k$ of said extracted features Z to the corresponding authorized user profile wherein said estimated similarity $S_k$ is derived by: (a) for each feature $Z_j$ in said extracted set of features Z, (i) determine the number $IN_j$ of test values for said feature $Z_j$-that lie within a feature interval $I_j=[\mu_t-\omega\sigma_t,\mu_t+\omega\sigma_t]$ where $\mu_j$ and $\sigma_j$, respectively, represent the mean and standard deviation of the trial values associated with the corresponding feature in the associated authorized user profile and ω represents a predefined number, (ii) determine the number $OUT_j$ of test feature values that lie outside said feature window $I_j$; (b) calculate IN, the sum of all $IN_j$ derived from step (a)(i); (c) calculate OUT, the sum of all OUTj derived from step (a)(ii); (d) set $S_k$ to be proportional to IN/(IN+OUT).

17. A method of verifying a previously identified authorized user $U_k$ from free typed text, comprising the steps of (1) retrieving an authorized user typing profile from an associated storage device, where said authorized user typing profile is associated with said previously identified authorized user, said authorized user typing profile containing a series of features having associated trial values derived from at least one trial typing sample of alphanumeric data from said previously identified authorized user; (2) receiving a test typing sample of alpha-numeric text from a text input device from a user identified previously as an authorized user, where said alpha-numeric test data is extracted from said user's ongoing text entry at said text input device without sending a notice to said user that said user's text entry is being used to compare to said authorized user profile, (3) extracting a set of test features Z from said received test typing sample, each test feature having a set of non-null numerical values; (4) determining which trial features in said authorized user profile are common with said extracted test features, and comparing said common extracted feature test values to said common authorized user typing profile feature trial values, to derive an authorized user score (5) associating said test typing sample with said previously identified authorized user if said authorized user test score is above a pre-determined value, where said authorized user score is proportional to a conditional probability estimate, $P(U_k/Z)$ that the authorized user $U_k$ generated the test values associated with said set of extracted features Z.

18. The method of claim 17 where said features are extracted from the user's ongoing text entry which comprise correspondence directed to another.

* * * * *